Figure 10:
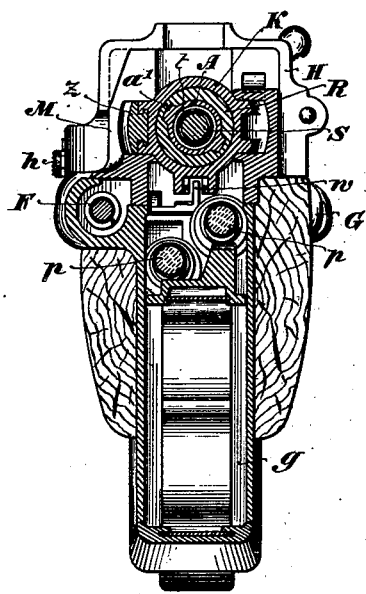

No. 783,123. PATENTED FEB. 21, 1905.
P. MAUSER.
RECOIL OPERATED SMALL ARMS.
APPLICATION FILED MAR. 4, 1903.
24 SHEETS—SHEET 1.
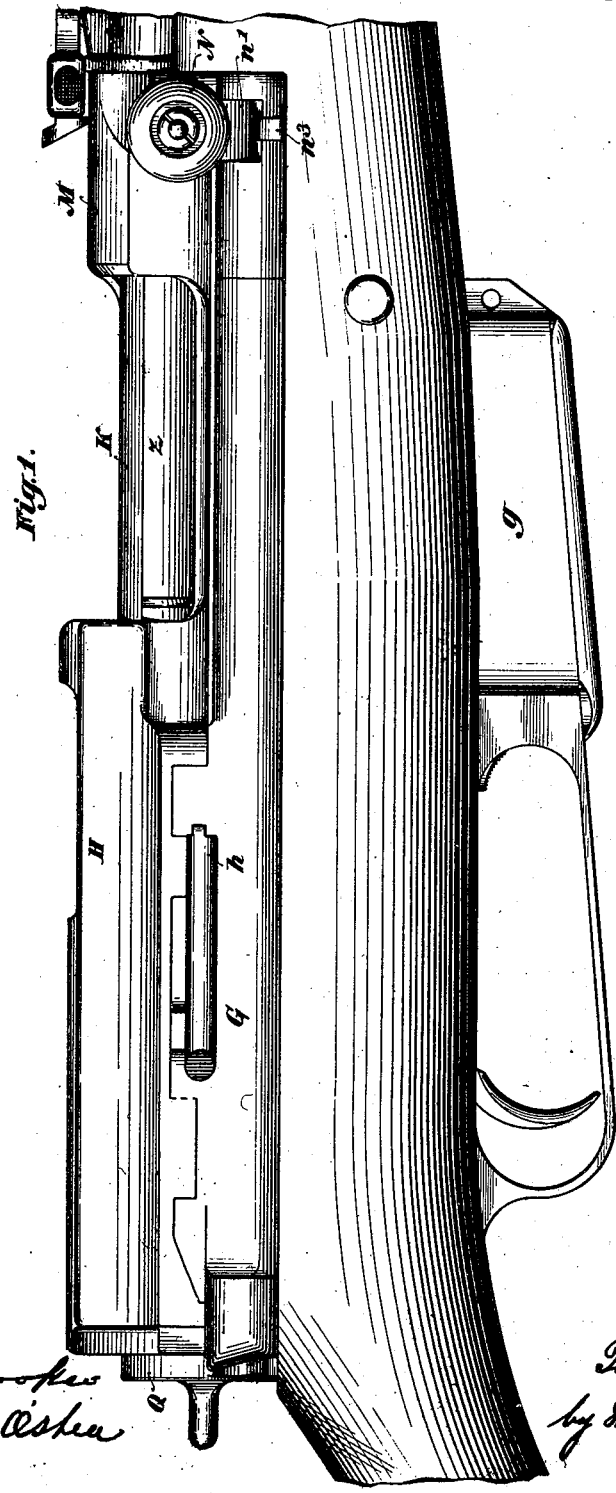

No. 783,123. PATENTED FEB. 21, 1905.
P. MAUSER.
RECOIL OPERATED SMALL ARMS.
APPLICATION FILED MAR. 4, 1903.
24 SHEETS—SHEET 2.
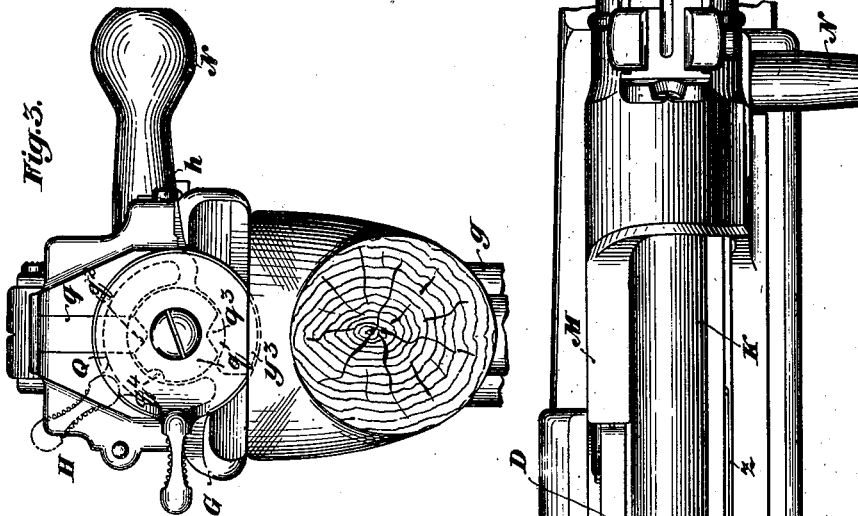
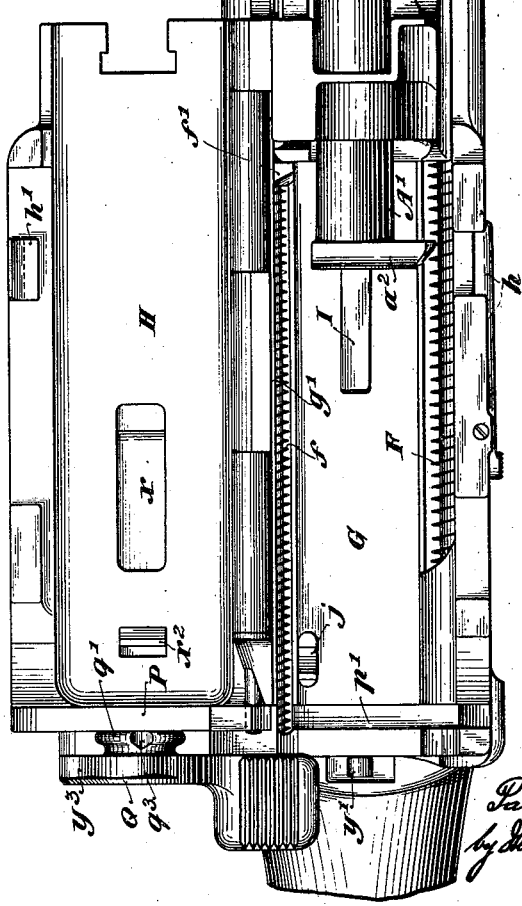

No. 783,123. PATENTED FEB. 21, 1905.
P. MAUSER.
RECOIL OPERATED SMALL ARMS.
APPLICATION FILED MAR. 4, 1903.
24 SHEETS—SHEET 3.
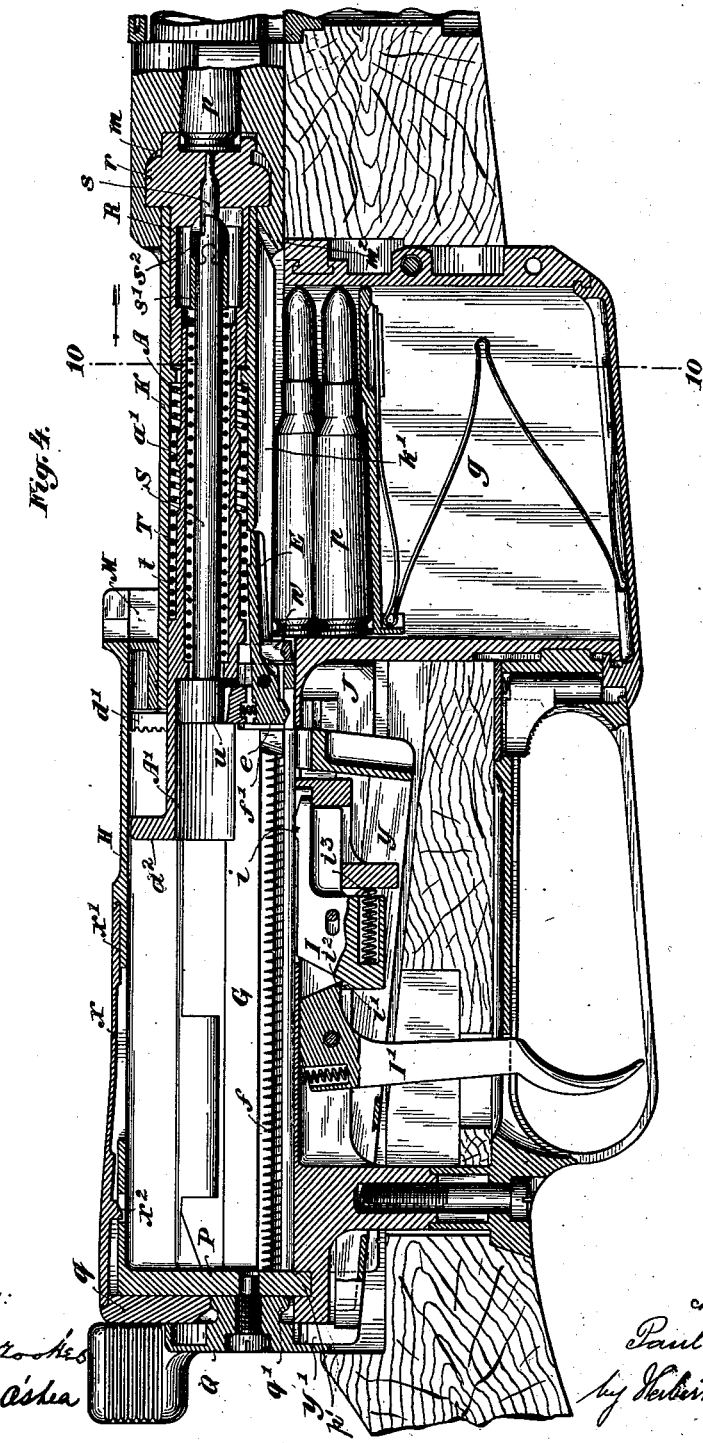

No. 783,123. PATENTED FEB. 21, 1905.
P. MAUSER.
RECOIL OPERATED SMALL ARMS.
APPLICATION FILED MAR. 4, 1903.
24 SHEETS—SHEET 4.
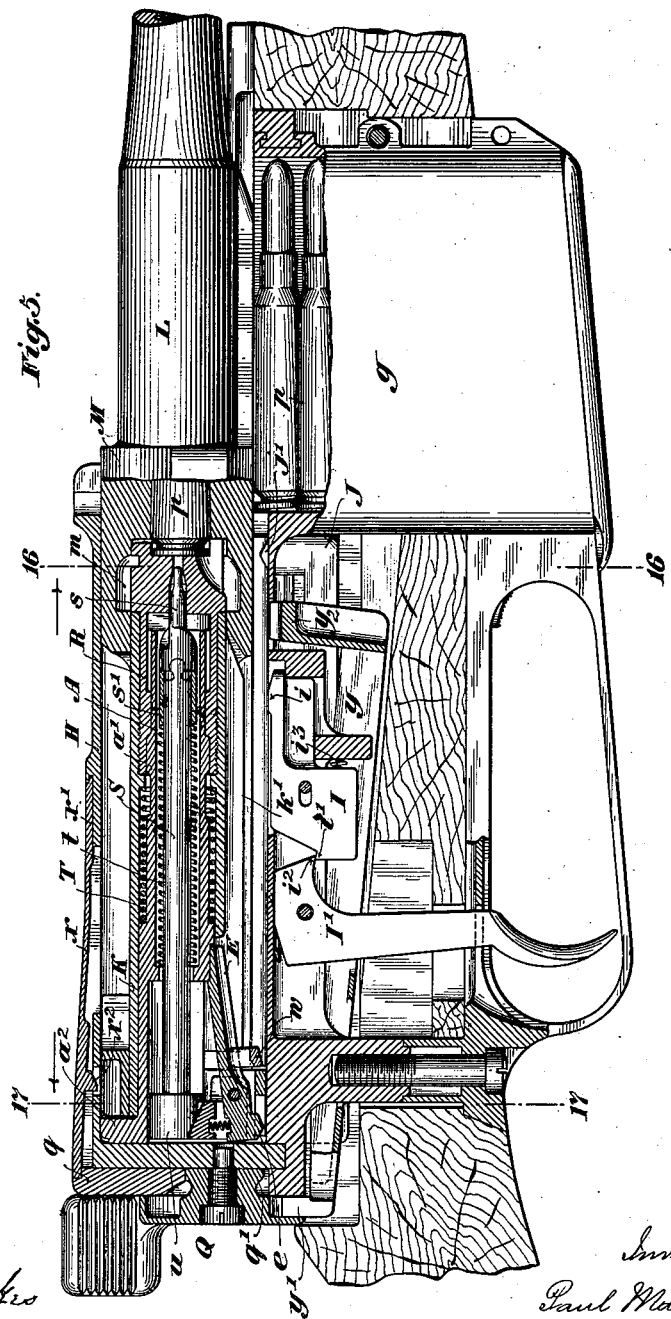

No. 783,123. PATENTED FEB. 21, 1905.
P. MAUSER.
RECOIL OPERATED SMALL ARMS.
APPLICATION FILED MAR. 4, 1903.
24 SHEETS—SHEET 5.
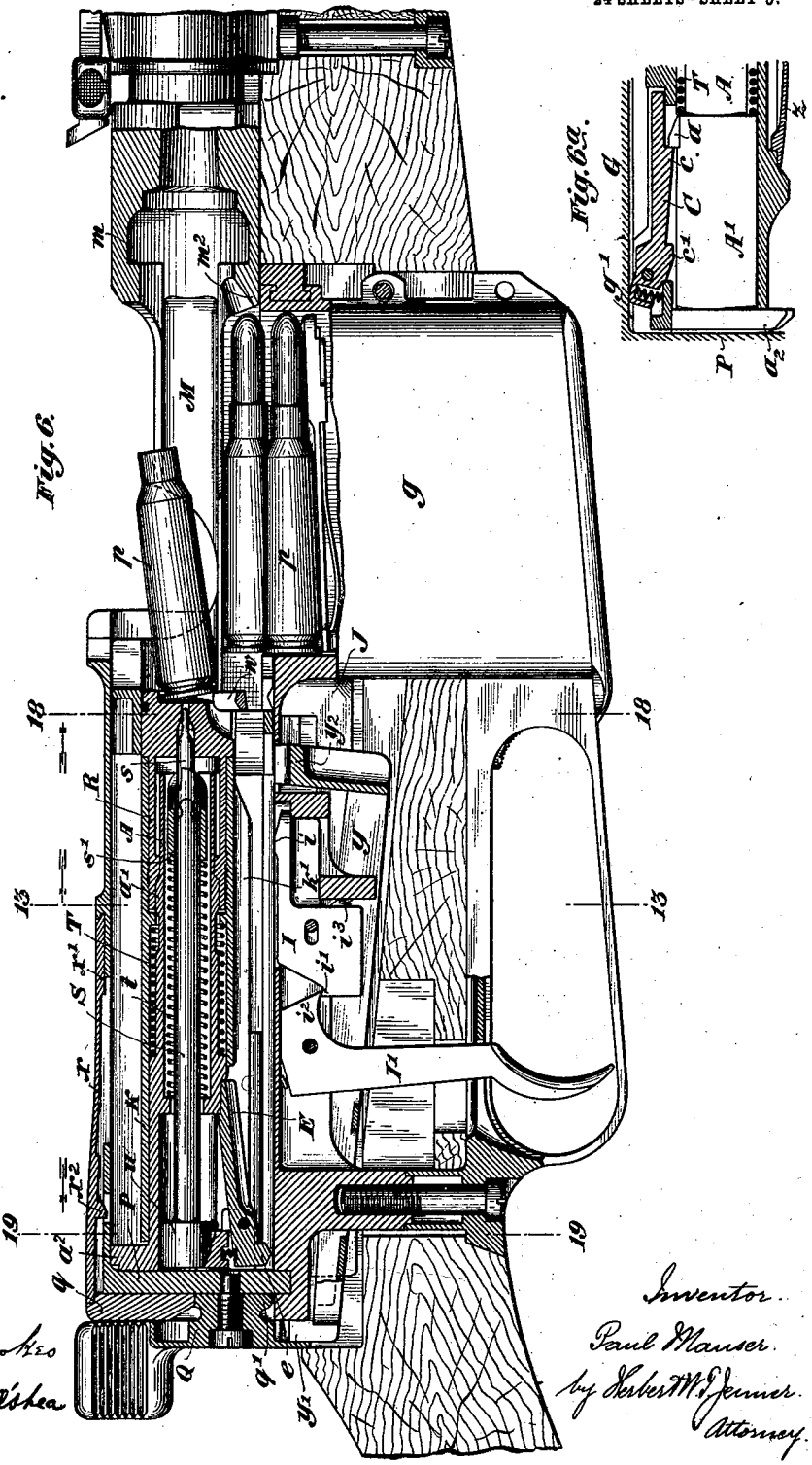

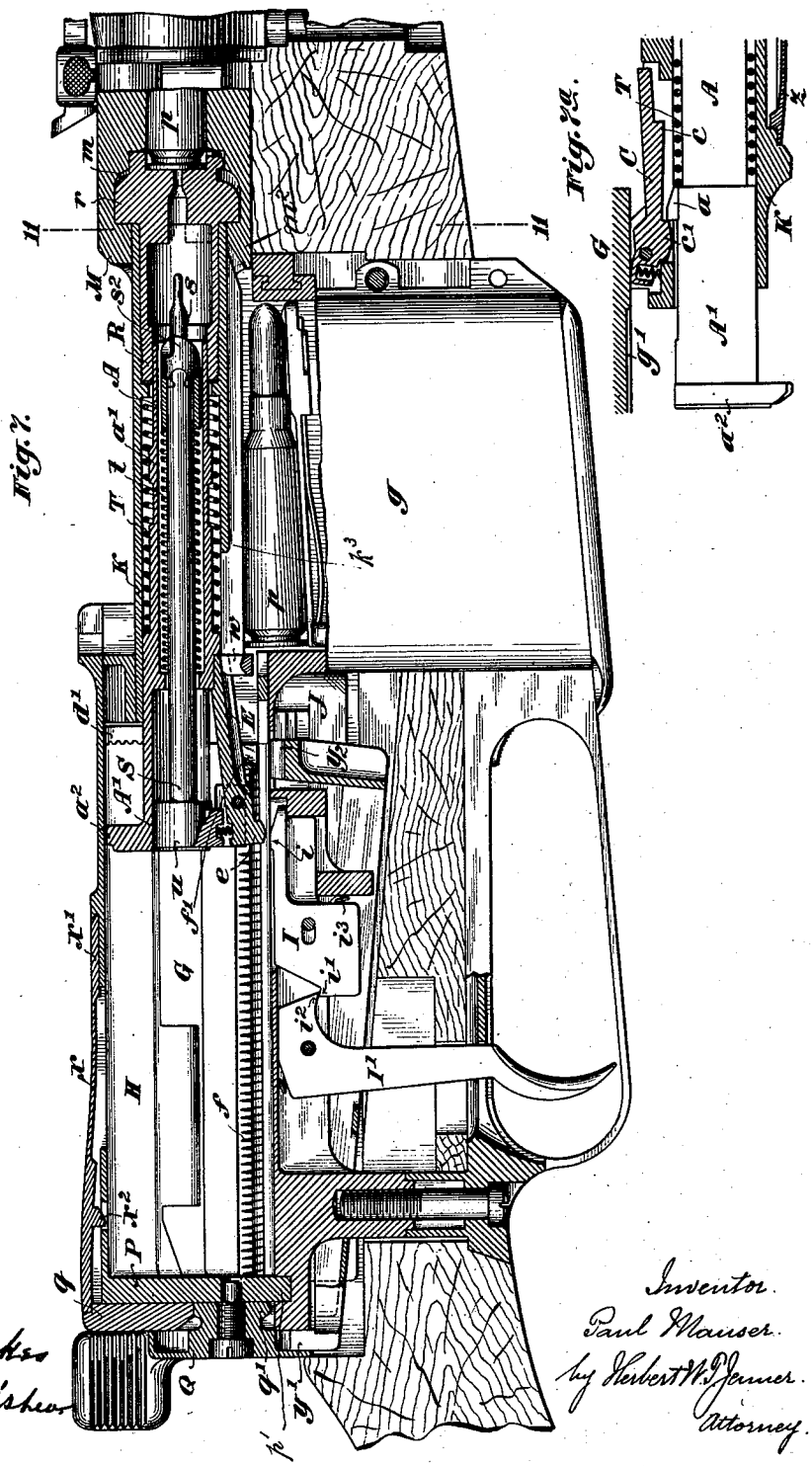

No. 783,123. PATENTED FEB. 21, 1905.
P. MAUSER.
RECOIL OPERATED SMALL ARMS.
APPLICATION FILED MAR. 4, 1903.
24 SHEETS—SHEET 7.
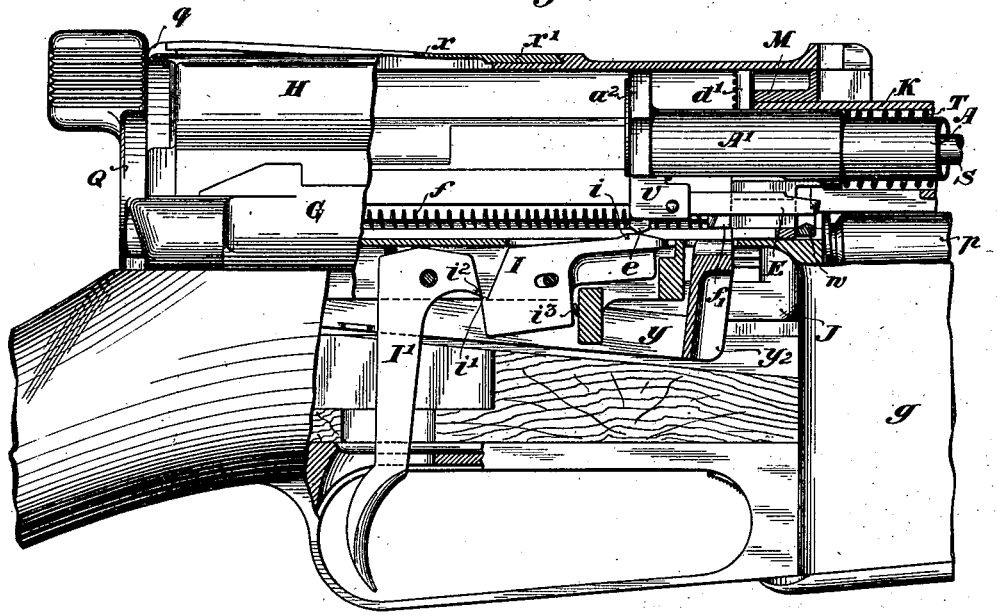
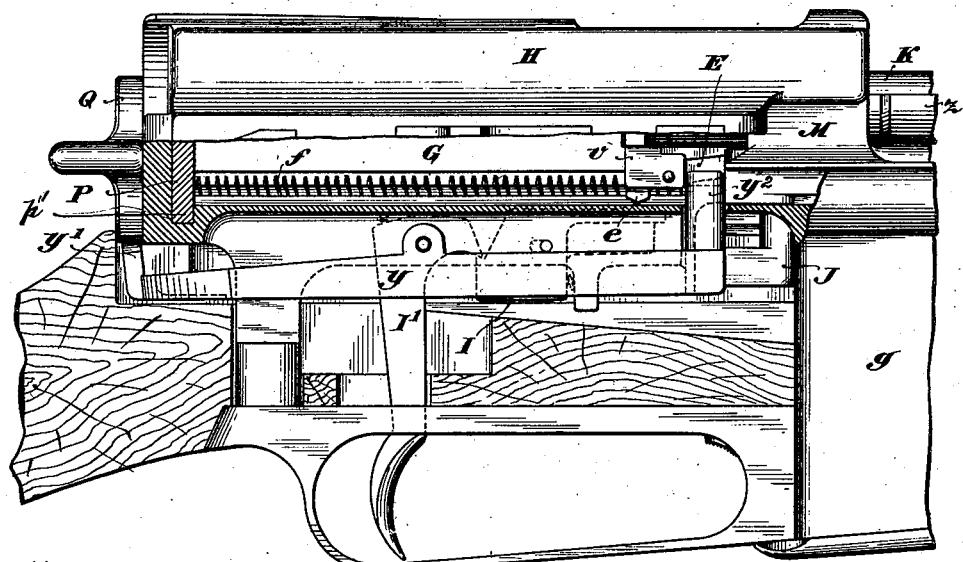

No. 783,123. PATENTED FEB. 21, 1905.
P. MAUSER.
RECOIL OPERATED SMALL ARMS.
APPLICATION FILED MAR. 4, 1903.

24 SHEETS—SHEET 8.

Witnesses:
C. B. Brookes
John C. O'Shea

Inventor
Paul Mauser
by Herbert W. S. Jenner
Attorney

No. 783,123. PATENTED FEB. 21, 1905.
P. MAUSER.
RECOIL OPERATED SMALL ARMS.
APPLICATION FILED MAR. 4, 1903.

24 SHEETS—SHEET 9.

Witnesses:
C. B. Brookes
John C. O'Shea

Inventor
Paul Mauser
by Herbert W. T. Jenner
Attorney

No. 783,123. PATENTED FEB. 21, 1905.
P. MAUSER.
RECOIL OPERATED SMALL ARMS.
APPLICATION FILED MAR. 4, 1903.
24 SHEETS—SHEET 10.
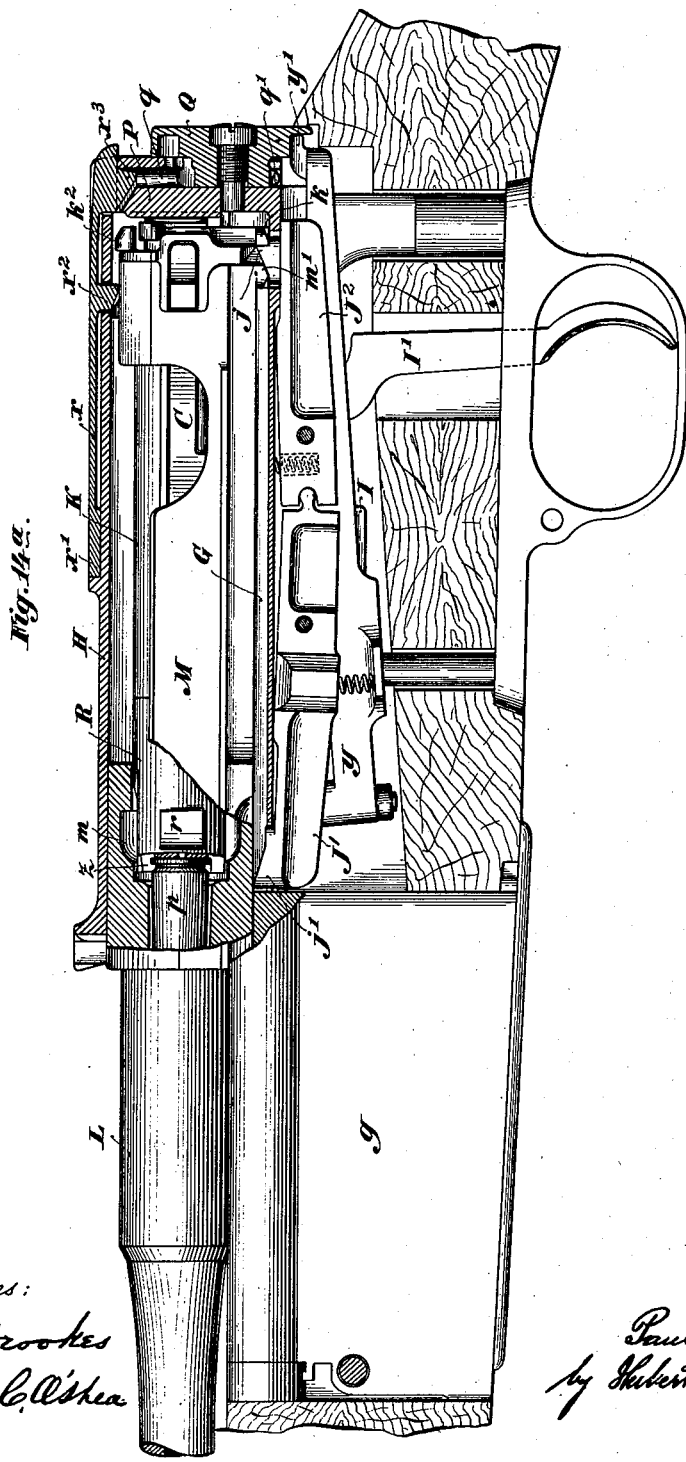

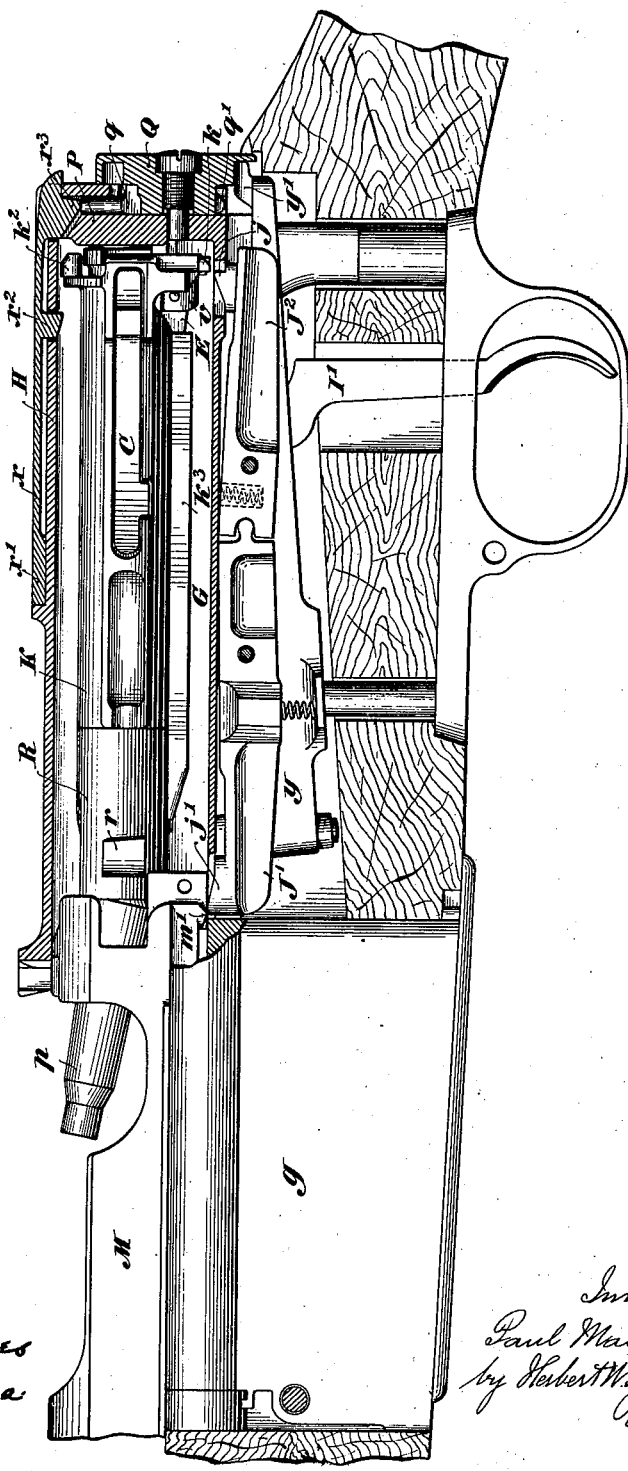

No. 783,123. PATENTED FEB. 21, 1905.
P. MAUSER.
RECOIL OPERATED SMALL ARMS.
APPLICATION FILED MAR. 4, 1903.

24 SHEETS—SHEET 12.

Witnesses:
C. B. Brookes
John C. O'Shea

Inventor.
Paul Mauser.
by Herbert W. T. Jenner.
Attorney.

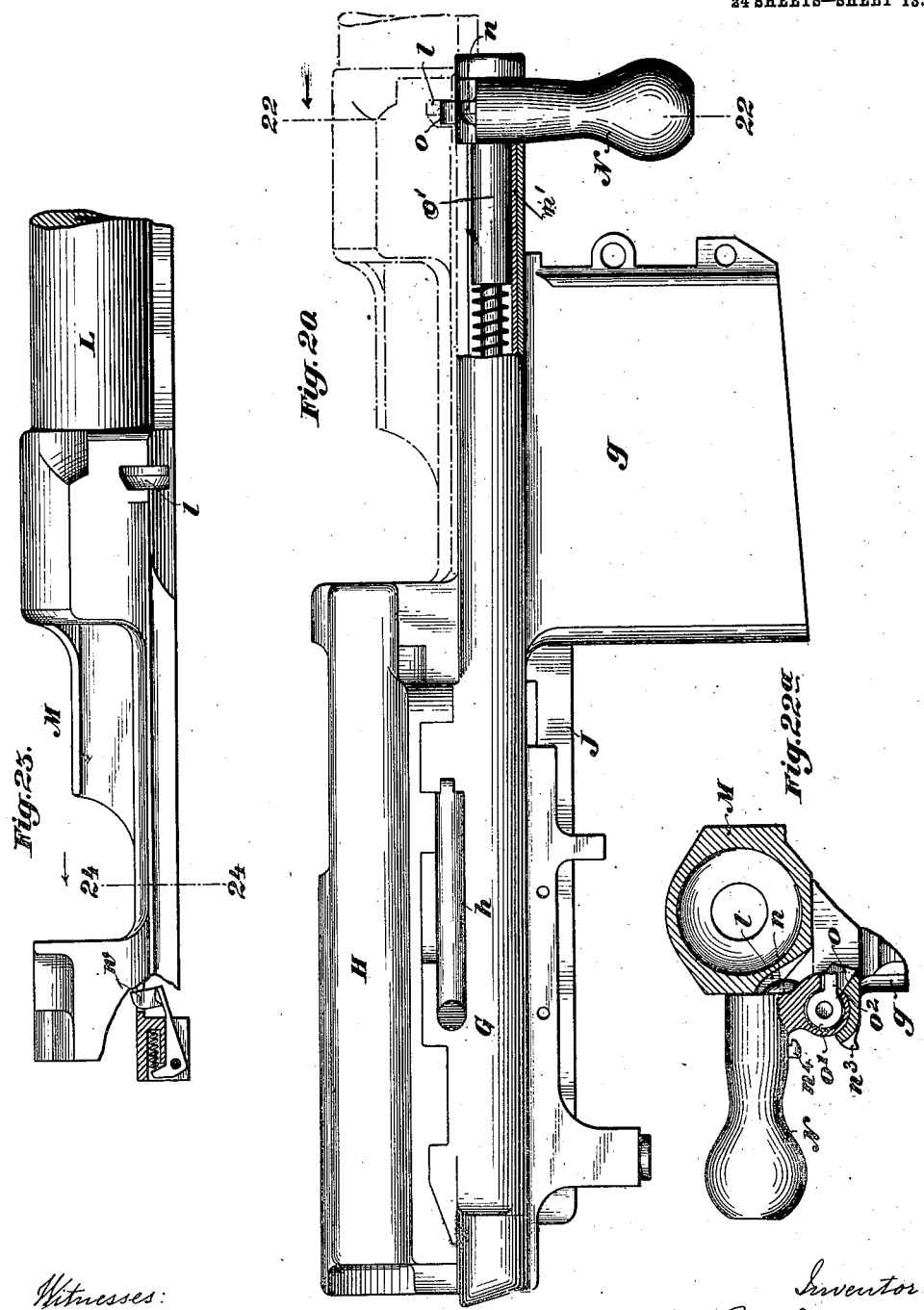

No. 783,123. PATENTED FEB. 21, 1905.
P. MAUSER.
RECOIL OPERATED SMALL ARMS.
APPLICATION FILED MAR. 4, 1903.
24 SHEETS—SHEET 14.
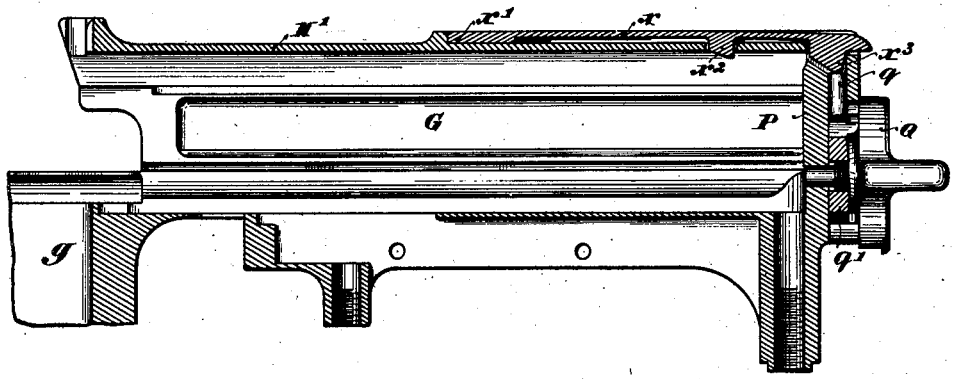
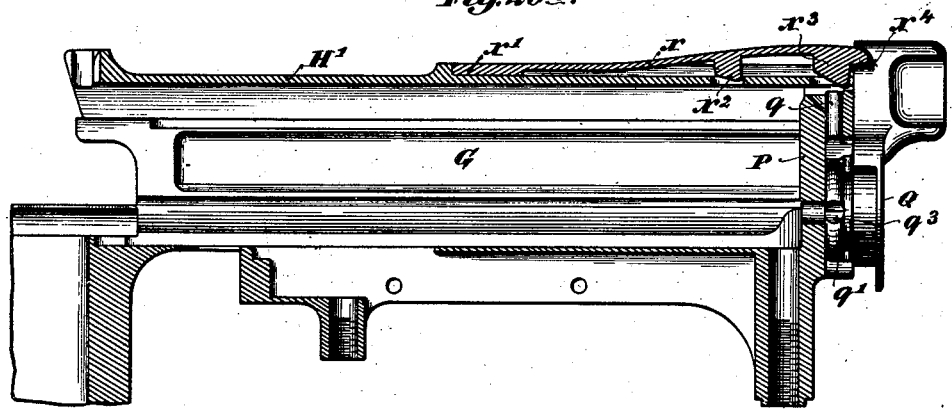
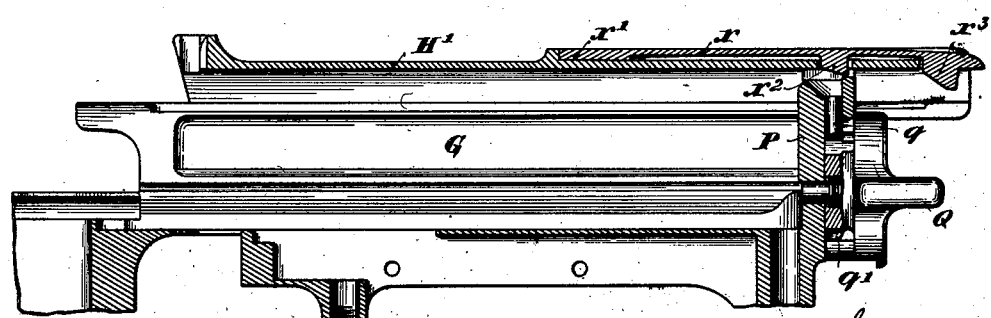

No. 783,123. PATENTED FEB. 21, 1905.
P. MAUSER.
RECOIL OPERATED SMALL ARMS.
APPLICATION FILED MAR. 4, 1903.

24 SHEETS—SHEET 15.

No. 783,123. PATENTED FEB. 21, 1905.
P. MAUSER.
RECOIL OPERATED SMALL ARMS.
APPLICATION FILED MAR. 4, 1903.
24 SHEETS—SHEET 16.
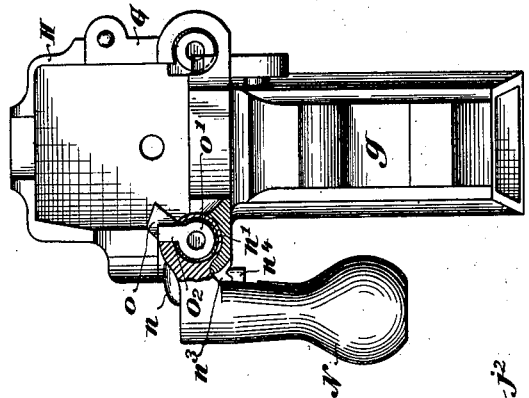
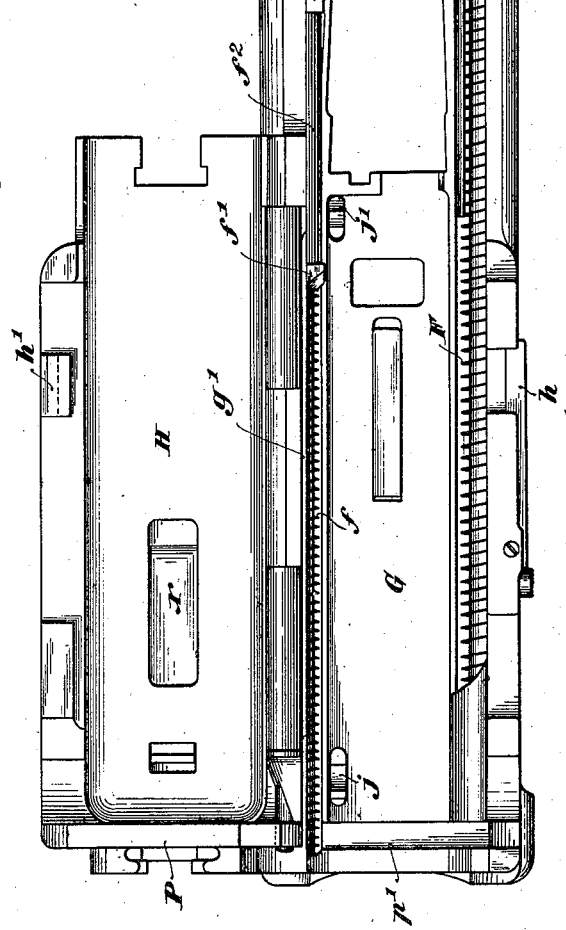
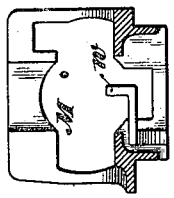
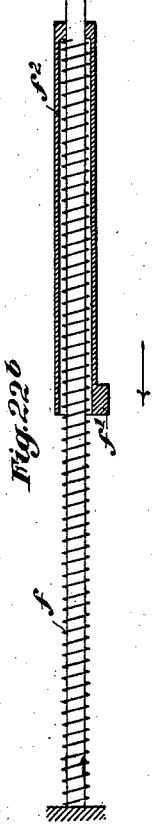
Witnesses:
Inventor.
Paul Mauser.
by Herbert H. Jenner
Attorney.

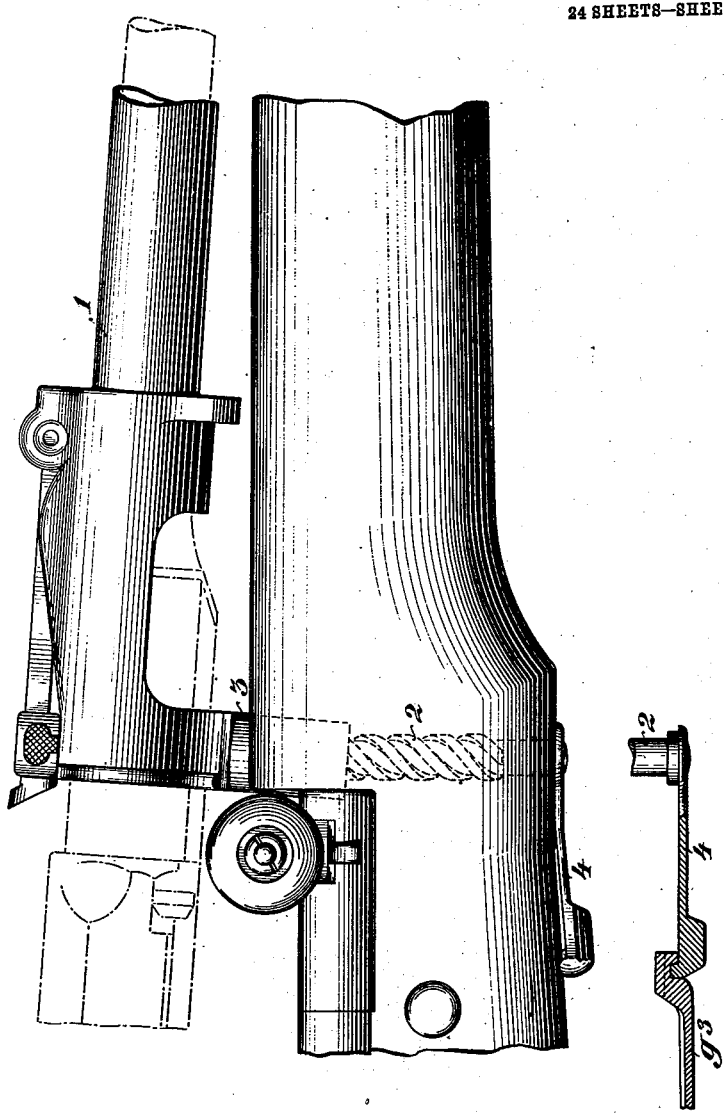
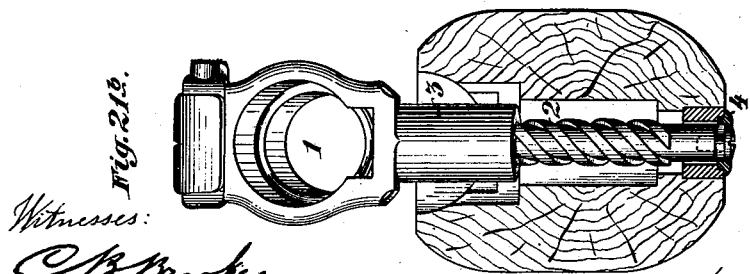

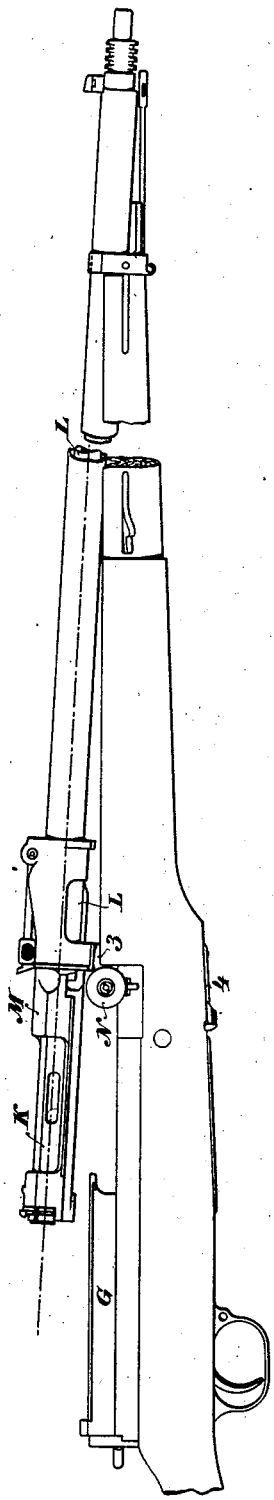

No. 783,123. PATENTED FEB. 21, 1905.
P. MAUSER.
RECOIL OPERATED SMALL ARMS.
APPLICATION FILED MAR. 4, 1903.
24 SHEETS—SHEET 19.
Fig.21ᶜ.
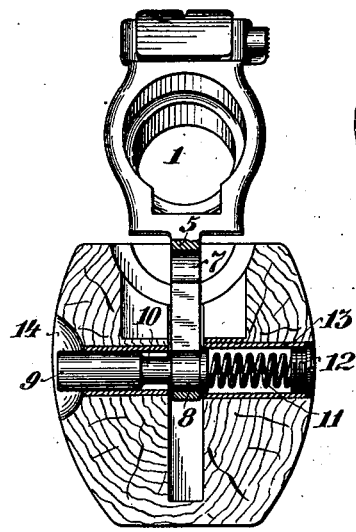
Fig.21ᵈ.
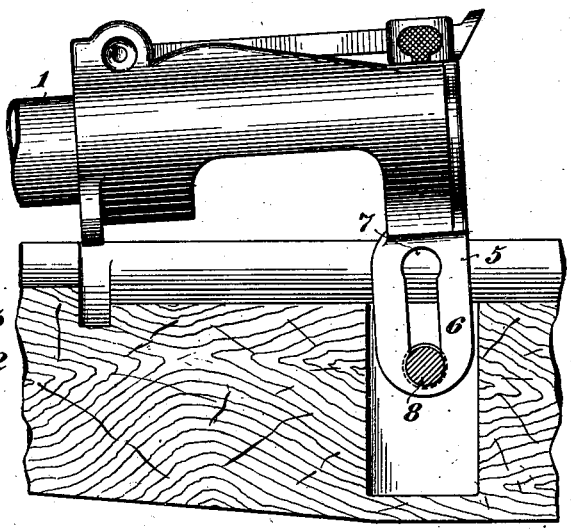
Fig.21ᵍ.
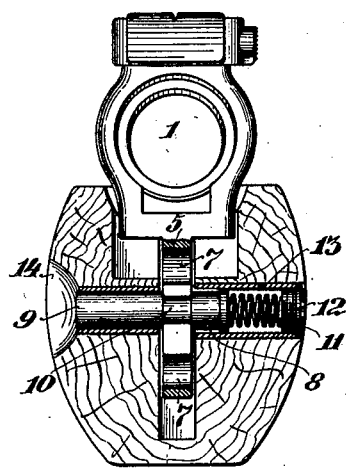
Fig.21ᶠ.
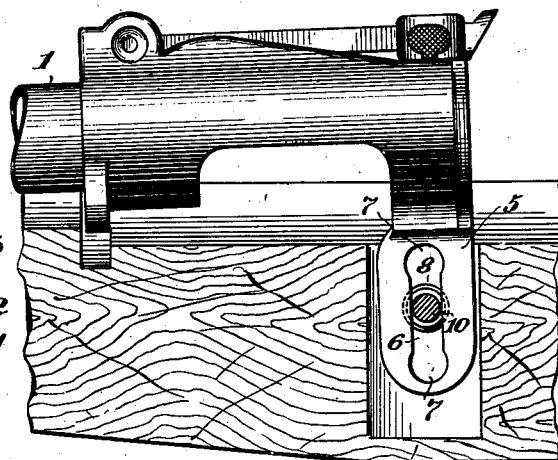
Witnesses:
C. B. Brookes
John C. O'Shea
Inventor
Paul Mauser
by Herbert W. T. Jenner
Attorney No. 783,123. PATENTED FEB. 21, 1905.
P. MAUSER.
RECOIL OPERATED SMALL ARMS.
APPLICATION FILED MAR. 4, 1903.

24 SHEETS—SHEET 20.

Witnesses:
Inventor.
Paul Mauser.
by Herbert W. J. Jenner.
Attorney.

No. 783,123. PATENTED FEB. 21, 1905.
P. MAUSER.
RECOIL OPERATED SMALL ARMS.
APPLICATION FILED MAR. 4, 1903.
24 SHEETS—SHEET 21.
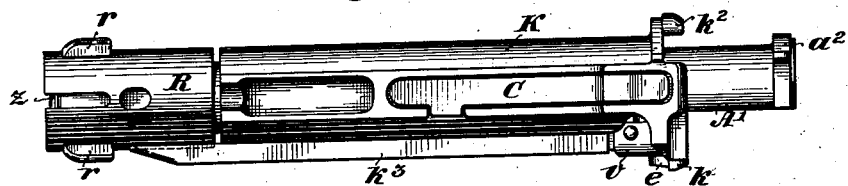
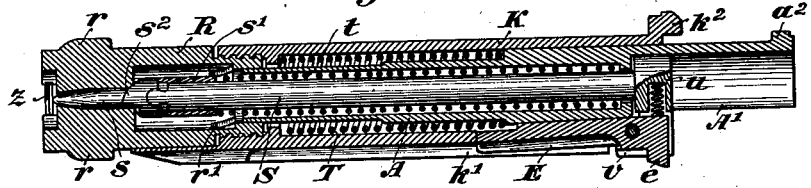
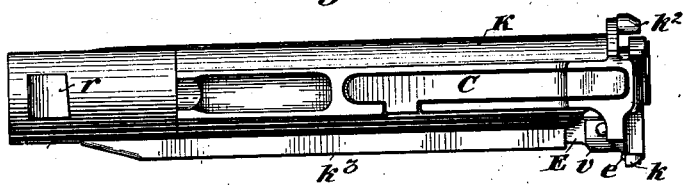
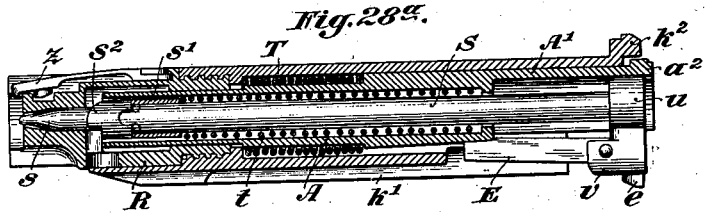
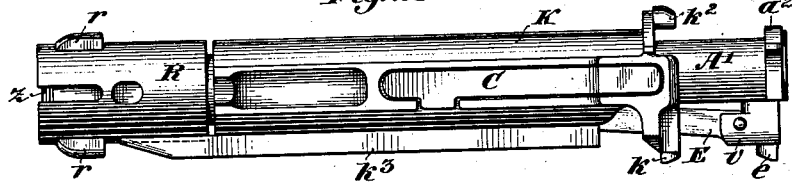
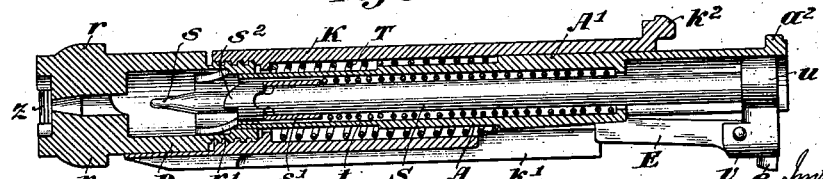
Witnesses:
B. Brookes
John C. O'Shea
Inventor.
Paul Mauser.
by Herbert W. P. Jenner.
Attorney.

No. 783,123. PATENTED FEB. 21, 1905.
P. MAUSER.
RECOIL OPERATED SMALL ARMS.
APPLICATION FILED MAR. 4, 1903.
24 SHEETS—SHEET 23.
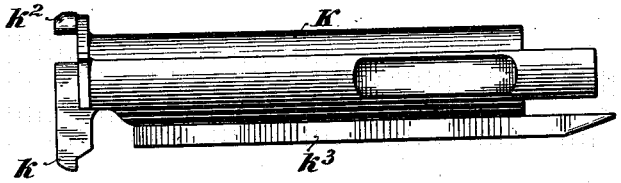
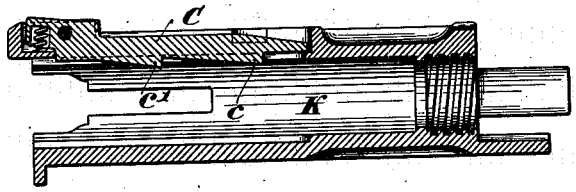
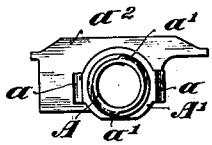
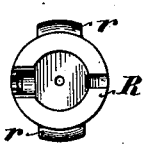
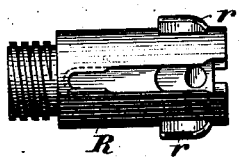
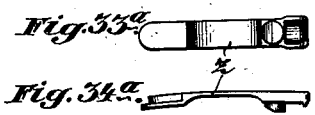
Witnesses:
C. B. Brookes
John C. O'Shea
Inventor.
Paul Mauser.
by Herbert W. T. Jenner
Attorney.

No. 783,123. PATENTED FEB. 21, 1905.
P. MAUSER.
RECOIL OPERATED SMALL ARMS.
APPLICATION FILED MAR. 4, 1903.
24 SHEETS—SHEET 24.
Fig. 40.
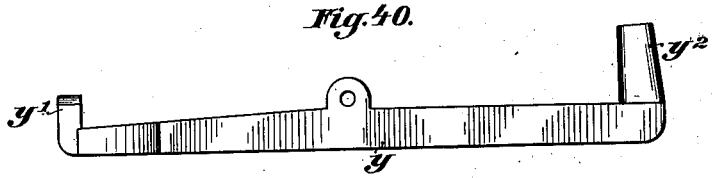
Fig. 41.
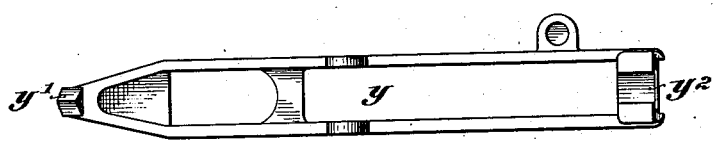
Fig. 42. Fig. 43.
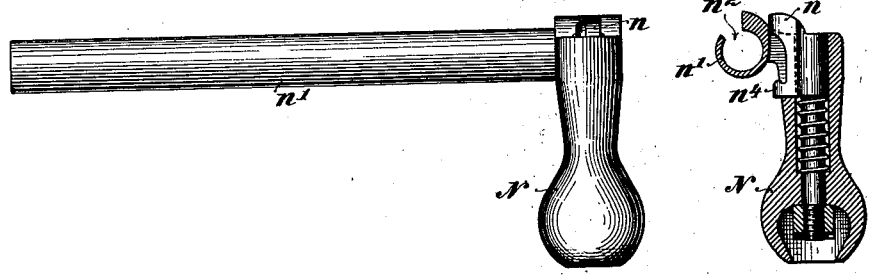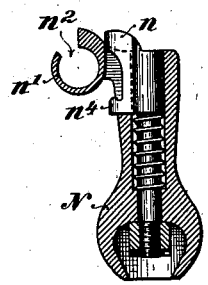
Fig. 44. Fig. 45.
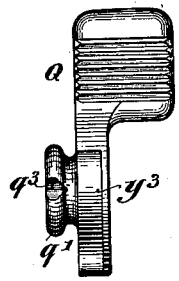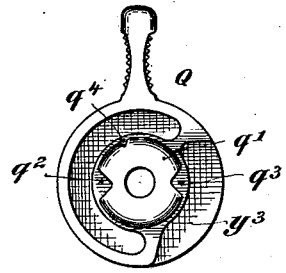
Fig. 46. Fig. 47.
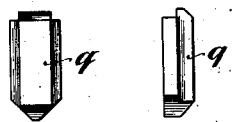
Witnesses:
C. B. Brookes
John C. Ashew
Inventor.
Paul Mauser
by Herbert W. T. Jenner.
Attorney.

No. 783,123.

Patented February 21, 1905.

UNITED STATES PATENT OFFICE.

PAUL MAUSER, OF OBERNDORF-ON-THE-NECKAR, GERMANY.

RECOIL-OPERATED SMALL-ARMS.

SPECIFICATION forming part of Letters Patent No. 783,123, dated February 21, 1905.

Application filed March 4, 1903. Serial No. 146,245.

*To all whom it may concern:*

Be it known that I, PAUL MAUSER, a subject of the Emperor of Germany, residing at Oberndorf-on-the-Neckar, Würtemberg, German Empire, have invented certain new and useful Improvements in Recoil-Operated Small-Arms, of which the following is a full, clear, and exact description.

In the majority of recoil-operated rifles with a movable barrel as hitherto used the barrel and breech-bolt, as is well known, move away from each other as soon as both have traversed a certain relatively very short portion of the return-path of the breech-bolt after firing. In other words, the movable barrel under the action of the recoil performs merely an initial movement, which generally is utilized in commencing the releasing movement or operation of the breech-bolt and barrel. After this operation has taken place the barrel advances again, while the breech-bolt by itself recedes for the greater part of its path or course. The essential condition at this point is that the separation between the barrel and breech-bolt should take place at a relatively early period, and this fact in itself constitutes a grave inconvenience, inasmuch as it involves not only an uneconomical use of the force derived from the recoil, but also the premature opening of the breech-bolt, in consequence of which the cartridge-cases, almost independently of the cartridge-extractor, are thrown out with such force that a certain amount of danger is involved, not only to the marksman, but also to the attendants or serving-men, and in addition to this the breech-bolt, or, in other words, the breech-operating mechanism, is subjected to so great a strain that, comparatively speaking, very great power impacts take place, with the result that the parts concerned are rapidly worn away, quite apart from the fact that this excessive recoil force involves a loss of effect in the relation between the force of the gunpowder and the projectile. For these reasons recoil-rifles with a short distance or range of rearward movement offer no prospects of success in practice, especially for military purposes.

Now this invention relates to the construction of a breech-loading rifle in which, after the weapon has been fired, both the barrel and breech-bolt coupled together, perform the complete receding movement jointly until the breech-bolt, has reached the end of its course or path. While this movement is being performed the force evolved by the gunpowder is utilized most economically, as is well known, owing to the fact that the barrel and breech-bolt as they jointly move to the end of their rearward course give the gunpowder-gases time to exert the whole of their force upon the projectile. This release of the breech-bolt takes place rapidly, but without any undue impact, so that too intense a wear upon the parts concerned is as much as possible avoided. The ejection of the cartridge-cases takes place quietly and steadily without any great display of energy, so that neither the marksman nor any of the persons happening to be in the vicinity run any risk of injury.

In accordance with this invention the recoil-rifle, with means for an extended recoil or rearward path, is so constructed that before the barrel and breech-bolt have reached the end of their path the disconnection between the breech-bolt and barrel is produced and completed automatically by the recoil the moment the barrel and breech-bolt find themselves in their end or extreme rearward position, so that the barrel may immediately advance while the breech-bolt is retained in its rearward position until the barrel has reached its forward position, whereupon after the swift forward movement of the breech-bolt the parts are automatically bolted or locked together by the action of a special spring which is compressed during the releasing movement.

In the accompanying drawings the improved recoil-operated firearm is, by way of example, represented in one of the forms in which the invention may be conveniently carried into effect.

Figure 11:
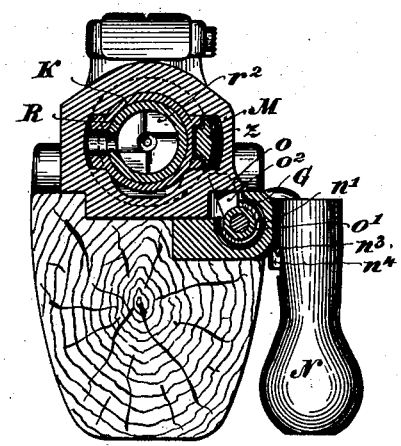
Figure 12:
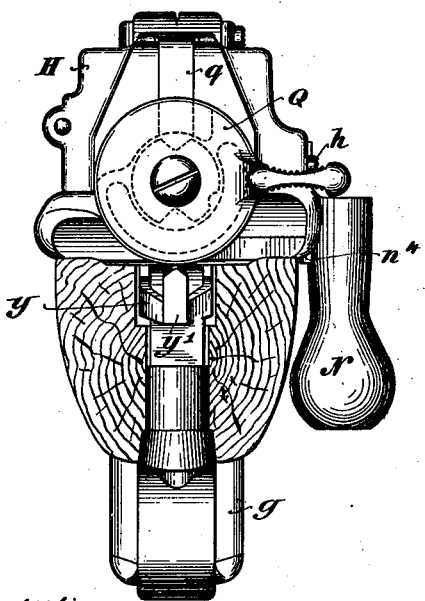
Figure 13:
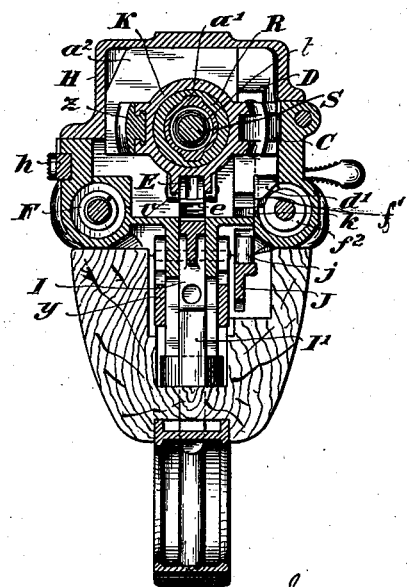
Figure 14:
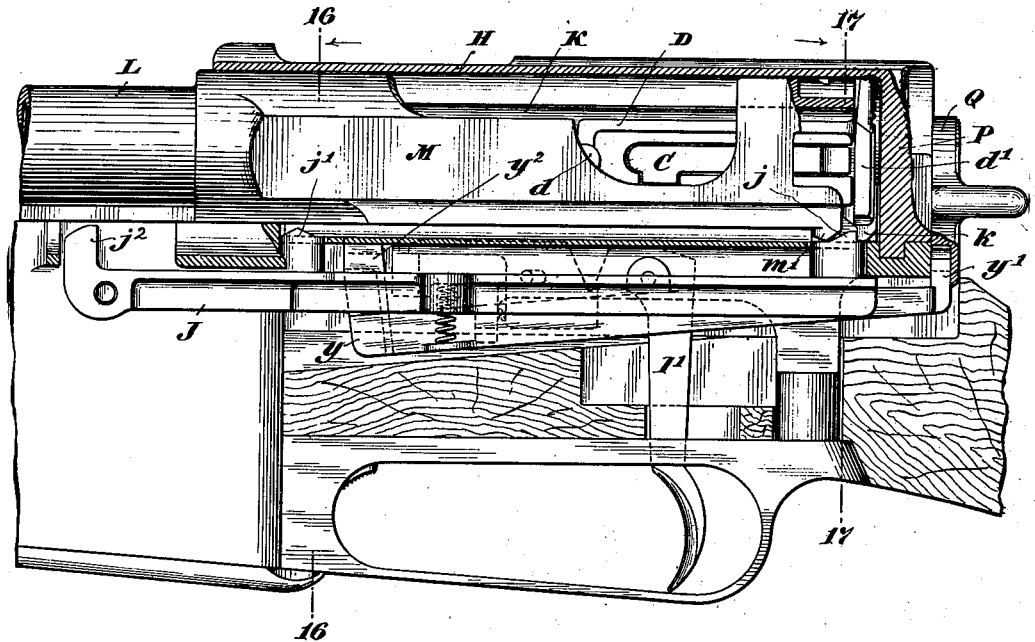
Figure 15:
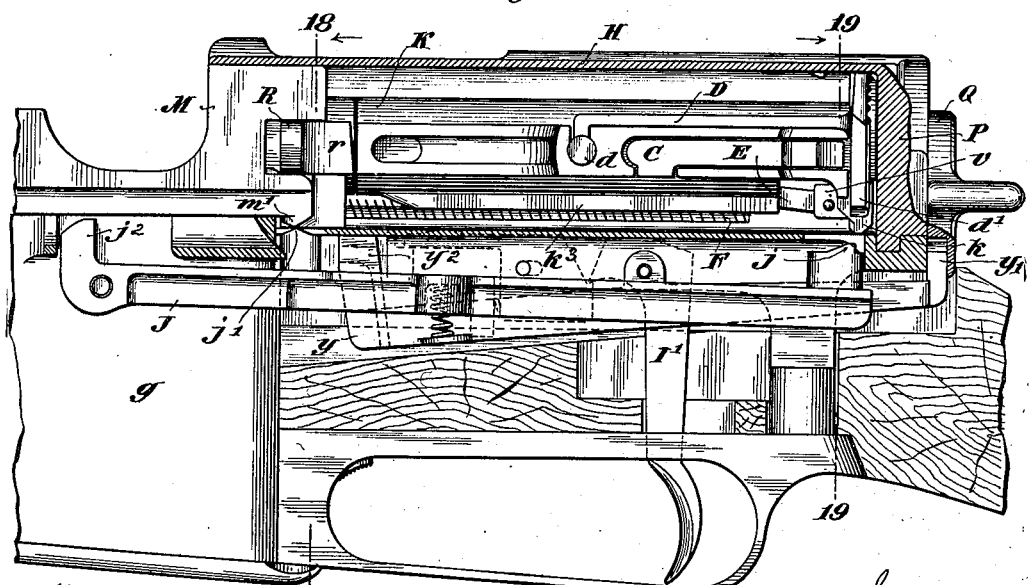
Figure 16:
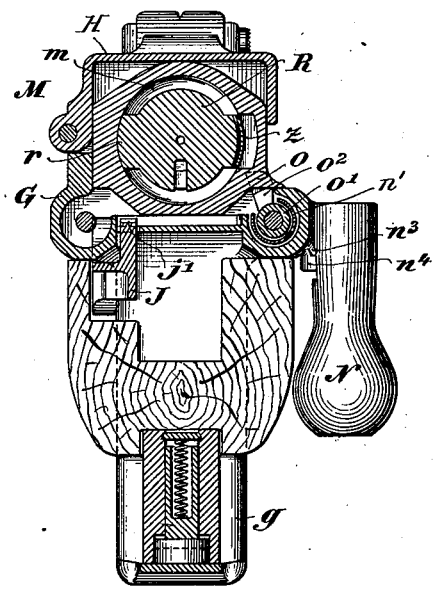
Figure 17:
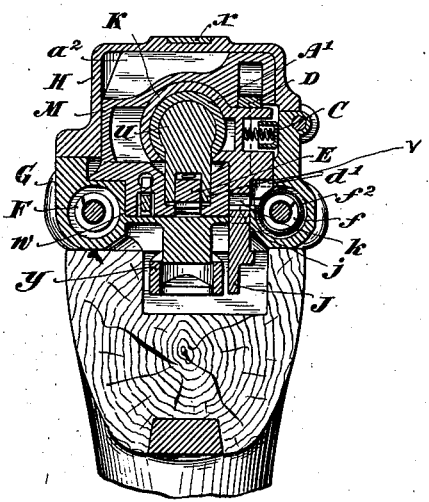
Figure 18:
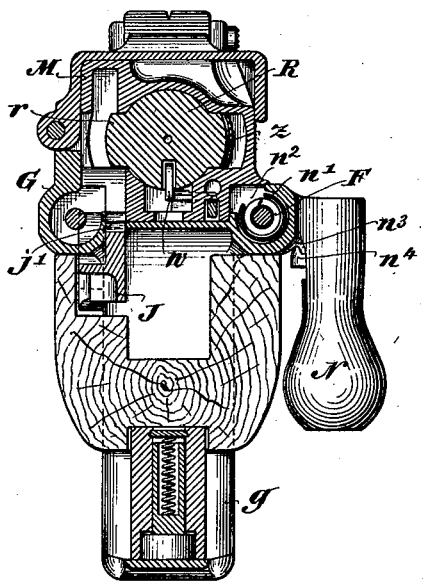
Figure 19:
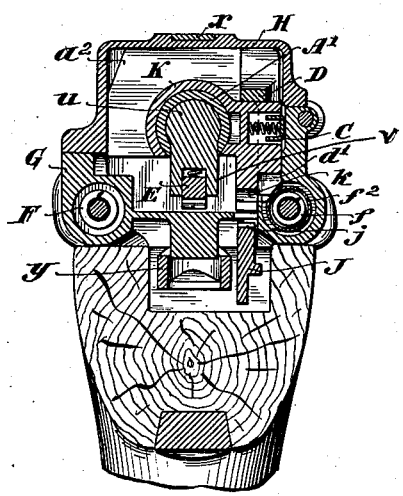
Figure 20B:
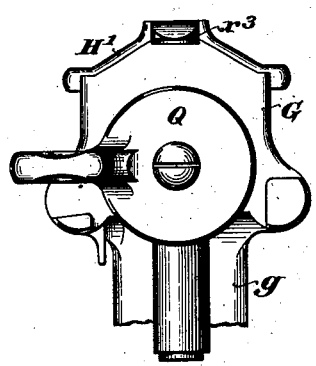
Figure 20D:
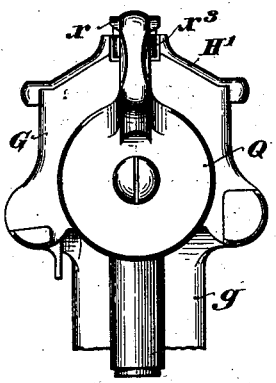
Figure 20E:
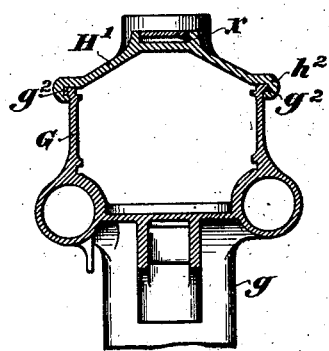
Figure 25:
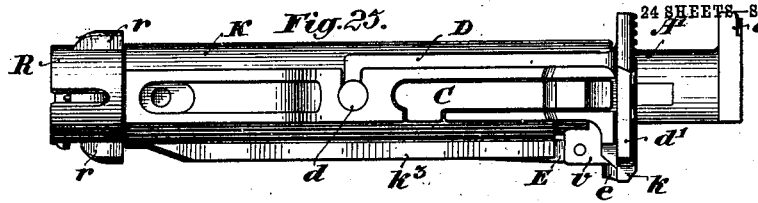
Figure 26:
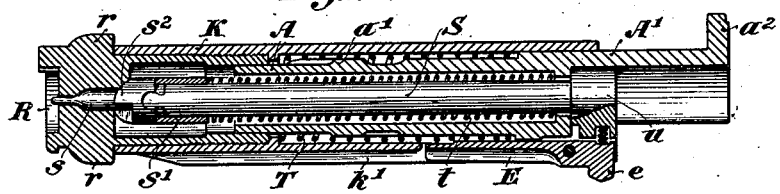
Figure 27:
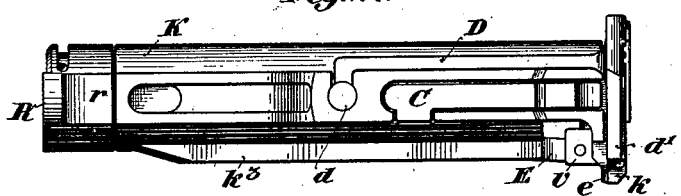
Figure 28:
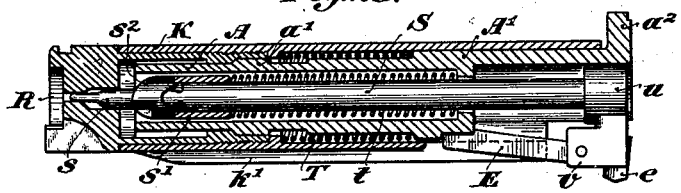
Figure 29:
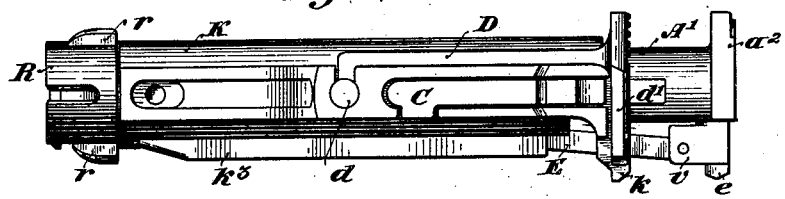
Figure 30:
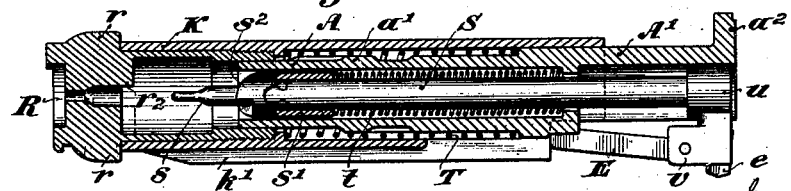
Figure 31:
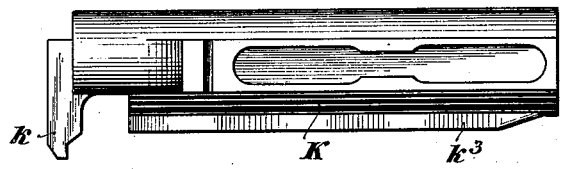
Figure 32:
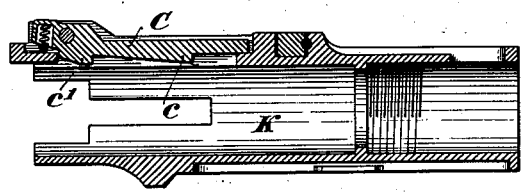
Figure 33:
Figure 34:
Figure 35:
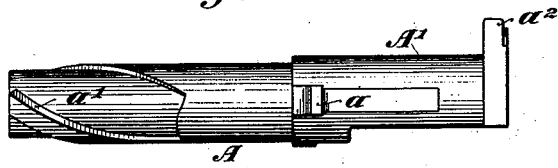
Figure 36:
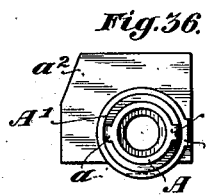
Figure 37:
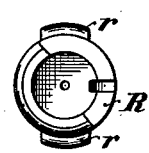
Figure 38:
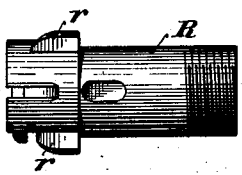
Figure 39:

Figure 1 is a side elevation of the weapon in the locked or cocked position—that is to say, with the breech-bolt locked in position and the barrel moved forward as far as it will go. Fig. 2 is a top view or plan corresponding to Fig. 1 with the receiver-cover open. Fig. 3 is a rear end view of Fig. 1. Fig. 4 is a longitudinal section with the breech-bolt in the same position as in Fig. 1. Fig. 5 is another longitudinal section of the same, but after firing, the barrel and breech-bolt being supposed, after their mutual release has been completed, to be in the rearward position—i. e., at the end of the rearward course or stroke of the breech-bolt—the barrel, however, being ready to advance again by itself, the breech-bolt being retained in its rearward position. Fig. 6 is also a longitudinal section representing the position which the parts occupy after the barrel has once more reached its extreme forward position just before the release of the breech-bolt. Fig. 7 shows the position of the parts after the breech-bolt has moved forward, or, in other words, after the striking or firing pin has been cocked, but before firing. Figs. 6$^a$ and 7$^a$ are detail views corresponding to Figs. 6 and 7 intended to illustrate the positions of the device for arresting the secondary or minor breech-bolt, formed by an inner sliding sleeve or tube inclosing the firing-pin. Fig. 8 is a special view illustrating the parts of the released trigger mechanism at the moment of firing, with the trigger pulled or the firing-pin freed and just about to rush forward. Fig. 9 represents the parts before firing, with the firing-pin cocked and secured in the cocked position while the trigger is at rest. Fig. 10 is a vertical cross-section on line 10 10, Fig. 4. Fig. 11 is another similar section on line 11 11, Fig. 7. Fig. 12 is an end view of Fig. 9 with the safety wing or leaf in the secured position. Fig. 13 is a vertical section on line 13 13, Fig. 6. Fig. 14 is a side elevation taken from the opposite side of Fig. 5, illustrating more particularly the locking device for retaining the breech-bolt when in the operative position. Fig. 14$^a$ shows the parts of the breech mechanism in the same position as Fig. 14, but with the modification that the bifurcated barrel-sleeve is shown partly in section and instead of a single arm-arresting lever J a double arm-arresting lever J' J$^2$ is arranged. The receiver and breech-bolt are also of a somewhat modified form. Fig. 15 is a side elevation taken from the opposite side of Fig. 6, illustrating the position of the arresting device when the several arresting parts, including the breech-bolt, are released by the barrel in the act of moving inward. Fig. 15$^a$ shows the parts of the breech mechanism in the same position as Fig. 15, but with the modifications of the receiver, breech-bolt, and arresting-lever as indicated in Fig. 14$^a$. Fig. 16 is a cross-section on line 16 16 of Figs. 5 and 14. Fig. 17 is a cross-section on line 17 17 of Figs. 5 and 14. Fig. 18 is a cross-section on line 18 18 of Figs. 6 and 15. Fig. 19 is a cross-section on line 19 19 of Figs. 6 and 15. Fig. 20 is an elevation of the receiver integral with the magazine, the operating-handle being engaged with the barrel or spring coupling device in position for automatic firing, the barrel and forward propelling-spring being at the same time coupled or engaged with each other. Figs. 20$^a$ to 20$^f$ represent the receiver in a modified construction, the operations requisite for releasing the cover being clearly shown by the corresponding working positions of the respective parts. Especially Figs. 20$^a$, 20$^c$, and 20$^e$ show the receiver with the cover in longitudinal section in three different positions, while in Figs. 20$^b$, 20$^d$, and 20$^f$ the receiver is shown in end elevation in corresponding positions of the parts. Fig. 21 is a top view or plan corresponding with Fig. 20 with the cover or lid of the receiver turned back. Figs. 21$^a$ to 21$^c$ show an erecting device by means of which the protecting-tube can be raised obliquely out of the opened receiver. Especially Fig. 21$^a$ shows the corresponding parts with raised protecting-tube in side elevation, Fig. 21$^b$ the same in end elevation, and Fig. 21$^c$ is a complete view on a smaller scale. Figs. 21$^d$ to 21$^g$ show another modification of such elevating or erecting device, whereupon in Figs. 21$^d$ and 21$^f$ the parts are shown in two different positions in side elevation, while Figs. 21$^e$ and 21$^g$ are the corresponding cross-sections and end elevations, respectively. Fig. 22 is a front elevation of Fig. 20, partly in section, on line 22 22, Fig. 20. Fig. 22$^a$ shows the operating-handle with the engaging or coupling device in position for single loading, the said handle being in engagement with the barrel, which has been disengaged by the forward propelling-spring. Figs. 23 and 24 show the barrel-sleeve with the bifurcated part, being respectively a side elevation and a section on line 24 24, Fig. 23. Fig. 25 is a breech-bolt shown in elevation by itself in position corresponding to that represented in Fig. 4 immediately after firing—i. e., with the inner sliding tube or sleeve in the rearward position, with the bolt-head in the locked position, and the firing-pin in the position which it occupies after completing its forward stroke. Fig. 25$^a$ shows in a view similar to Fig. 25 another modification of the breech-bolt, in which the connection of the bolt-head with the outer sleeve of the breech-bolt is established by a square thread, and the inner sliding sleeve is of a somewhat modified form. Fig. 26 is a longitudinal section corresponding to the foregoing figure. Fig. 26$^a$ shows the modified construction of the breech-bolt in a longitudinal section corresponding to Fig. 26. Fig. 27 shows the breech-bolt also in elevation, but corresponding to Figs. 5 and 6—i. e., with the inner sliding sleeve or tube in the forward position and with the bolt-head in the unlocked position. Fig. 27$^a$ shows the modified construction of the breech-bolt in the elevation and in the position of the parts as in Fig. 27. Fig. 28 is a corresponding longitudinal section. Fig. 28$^a$ shows the modified construction of the breech-bolt in a longitudinal section corresponding to Fig. 28. Fig. 29 is an elevation of the breech-bolt corresponding to Fig. 7, showing the position of the parts before firing, with the firing-pin cocked. Fig. 29$^a$ shows the modified construction of the breech-bolt in the elevation and in the position of the parts as in Fig. 29. Fig. 30 is a corresponding longitudinal section. Fig. 30$^a$ shows the modified construction of the breech-bolt in a longitudinal section corresponding to Fig. 30. Figs. 31 and 32 represent the outer sleeve of the breech-bolt alone—that is to say, without the interior parts—being, respectively, an elevation and a longitudinal section thereof. Figs. 31$^a$ and 32$^a$ show the outer sleeve of the breech-bolt in its modified construction in elevation and in longitudinal section, respectively. Figs. 33 and 34 respectively show the extractor in elevation and in plan. Figs. 33$^a$ and 34$^a$, show the extractor of the modified breech-bolt in rear elevation and plan, respectively. Figs. 35 and 36, respectively, are a side elevation and an end view of the inner sliding sleeve or tube A of the breech-bolt. Figs. 35$^a$ and 36$^a$ show the modified inner sliding sleeve in side and end elevations, respectively. Figs. 37, 38, and 39 are respectively a front elevation, a side elevation, and a rear end view of the bolt-head. Figs. 37$^a$, 38$^a$, and 39$^a$ show the modified bolt-head in complete side and end elevations, respectively. Figs. 40 and 41 are respectively a side elevation and a top view or plan of the securing or fastening lever. Figs. 42 and 43 are respectively a side elevation and a cross-section of the operating-handle, with its sliding tube or sleeve; and Figs. 44 to 47 represent the remaining parts of the mechanism for locking or securing the breech-bolt, being side and front elevations thereof, respectively.

As mentioned in the introductory part of this specification, the automatic operations of the new weapon take place in the following manner: After firing, Fig. 4, the barrel L and outer sleeve K of the breech-bolt coupled together jointly perform their rearward movement. During the last phase of this rearward movement the unlocking process—to separate the barrel from the outer sleeve of the breech-bolt—is initiated, for even before the barrel and breech-bolt have reached their extreme rearward position the inner sliding sleeve A, which forms the auxiliary or minor breech, with its projecting rearward end A′, impinges upon the thrust or end piece P, which closes in the receiver at the rear. By the time the breech-bolt reaches the limit of its rearward movement in the receiver the outer sleeve of the breech-bolt has become disengaged from the barrel. (See Fig. 5.)

The locking and unlocking between the barrel and outer sleeve of the breech-bolt are effected by means of the bolt-head R, which is automatically rotated by the inner sliding sleeve or tube A, which is movable within the said breech-bolt and which engages by helical projections $a'$ in corresponding grooves $r'$, formed for the purpose in the bolt-head. The said inner sliding sleeve in its turn receives its proper rearward movement, which effects the bolting or locking, through the medium of a spring T, specially provided for the purpose within the outer sleeve of the breech-bolt, while the forward displacement, whereby the unlocking is effected, is obtained, as mentioned before, by the action of the part $a^2$ of the sleeve A, which in the locked position projects rearward beyond the breech-bolt end and which as the breech-bolt and barrel recede impinges upon the thrust end piece P and is thereby driven forward, the sleeve at the same time turning the bolt-head R, with its nipples $r$, into the disengaged position through the medium of its helical projections $a'$.

After the unlocking has been completed the barrel L, under the action of its forwardly-propelling spring F, again advances, Fig. 6, while the outer sleeve K of the breech-bolt is retained in its rearmost position immediately after the disengagement has taken place by means of an arresting-lever J, which with a nose or projection $j$ takes up its position in front of a rearward projection or extension $k$ of the outer sleeve K (see Fig. 14) until the barrel has reached its forward position. Such barrel, owing to the action of a stop $m'$ of the barrel extension upon the projection or nose $j''$ of the lever J, at the same time automatically effects the release of such lever. (See Fig. 15.) The breech-bolt thereupon springs forward to its closed position under the action of its spring $f$, when, after it has reached its forward position, the secure engagement between the barrel and breech-bolt, by means of the spring T, which has been previously compressed and now automatically expands, takes place, the said spring having moved the inner sliding sleeve A rearwardly, and thereby set the bolt-head R in the rotary motion, Fig. 7.

The weapon is also fitted for single loading, for which purpose the handle N is so constructed as to be capable of being turned or folded down and combined with coupling or engaging mechanism $n$ or $o$, as the case may be, whereby according to the position of the handle the latter comes either into engagement with the barrel-sleeve M, and the barrel-propelling spring is thus disengaged, (being the position for magazine loading or for the first shot, as the case may be,) Fig. 22$^a$, or out of engagement with the said barrel-sleeve when the barrel L is coupled with its spring F, being the position for the automatic operation of the weapon.

So much for the general mode of operation of the weapon. The arrangement of the individual parts is as follows: With regard, first of all, to the construction of the breech-bolt, Figs. 25 to 30, it substantially consists of a cylindrical outer sleeve K of the breech-bolt, into the forward end of which the bolt-head R, provided with the nipples $r$, is screwed. The inner sliding sleeve A is arranged movably in the longitudinal direction within the outer sleeve of the breech-bolt, so as to act as an auxiliary or minor locking device, which under the action of the spring T, also arranged within the outer sleeve of the breech-bolt, (one end of which abuts against an inner projection of the said outer sleeve, while the other rests against an annular shoulder of the said sleeve,) is retained in the position particularly illustrated in Figs. 25 and 26 and also Figs. 29 and 30, wherein the rearward part A', provided with a shoulder $a^2$, protrudes for a certain distance beyond the rear end of the breech-bolt. The sleeve A, Figs. 35 and 36, at its forward end is provided with helical ribs $a'$, which engage in corresponding grooves $r'$ in the inner wall of the bolt-head R, so that the said sleeve whenever it moves forward or rearward, as the case may be, may impart a rotary movement to the said bolt-head. The arrangement is such that in the position shown in Figs. 25 and 26 the breech-bolt head, with its nipples, is in the "locked" position, the said nipples taking up their respective positions behind corresponding projections within the barrel-sleeve, thus effecting the engagement between the barrel and breech-bolt in the manner usual in weapons fitted with breech-locking devices of this type. Now when, as before mentioned, during the rearward movement of the mechanism the part A' of the inner sliding sleeve A meets or strikes the end piece P the said sleeve is moved forward, while at the same time the bolt-head receives a rotary movement, by performing which it comes into the unlocked position, in which its nipples $r$ are placed in front of the issuing-grooves in the barrel extension. Laterally in the wall of the outer sleeve of the breech-bolt there is provided an arresting-lever C, serving as a holder, which possesses two noses or projections $c$ $c'$ and which under the pressure of a spring acting upon its rear end is retained in position with both its noses projecting into the path of a projecting part $a$ of the piece A' of the said inner sleeve A. When the sleeve has been pressed into its forward position, Figs. 27 and 28, where, as before mentioned, the receiver, with its nipples, is in the disengaged position, the projection $a$ comes to rest upon the nose $c$ of the lever C, so that the sleeve is retained in place in opposition to the pressure of the spring T, Fig. $6^a$. In the extreme rearward position of the said sleeve, which is coincident with the locked position of the bolt-head and its nipples, Figs. 25 and 26, the sleeve is retained and prevented from any further rearward movement by the nose or projection $c'$ of the lever C. The release of such lever C, or, in other words, that operation of this lever whereby for the purpose of releasing the inner sliding sleeve to permit it to move rearward the nose $c$ is moved away from the projection $a$, is effected by the rearward part of the lever C, which as the breech-bolt moves forward comes out of a groove $g'$ of the receiver G and impinges upon the solid wall of the receiver, as illustrated in Fig. $7^a$. There is furthermore provided on the breech-bolt an oscillating arm D, Figs. 14 and 15, which, with a pivot-shaped projection or stud $d$, is supported in the wall of the breech-bolt. Toward the rear this lever has a vertical downwardly-projecting arm $d'$, which serves to throw the breech-bolt into engagement with the forwardly-propelling spring $f$, as will be presently explained.

In the inner sliding sleeve or secondary lock the firing-pin S and its controlling-spring $t$ are also accommodated, Figs. 25 to 30. The firing-pin in this arrangement of the rifle consists of two parts, the front part $s$ being placed as a separate piece upon the rear part, which forms the stock or butt proper of the firing-pin. The portion $s$ here is provided with a sleeve-like extension $s'$, which receives the forward end of such stock. The connection between the butt-end and the said portion $s$ is secured by an arrangement somewhat similar to the engagement of the bit of a key in a lock. At the rear end the stock has a collar $u$, which terminates downwardly in a fork-shaped part $v$, Figs. 25, &c. In this fork-shaped part is suspended the sear E, whereof the rear end is provided with a downward projection or nose $e$, while its forward end has a square-shaped notch or recess. When the firing-pin is cocked, Figs. 29 and 30, such sear E is suspended with such recess or notch against the sleeve A and remains in such position until eventually after the breech-bolt has moved forward the sear E is by the operation of the trigger device—$i.$ $e.$, by pressure upon its nose $e$—released from engagement, thereby allowing the firing-pin to rush forward.

The trigger mechanism is illustrated in Figs. 6, 7, and 8 and consists mainly of the trigger I' and the idler or dog I, the latter of which at its front end is provided with the nib or nose $i$, intended by its action upon the nose $e$ of the sear E to effect the release of the latter, and thereby to enable the firing-pin to spring forward. The important feature here is that the dog I has a slot within which its pivot is placed, thus admitting of its longitudinal and axial displacement, while toward its rear end it is provided with a shoulder $i'$, with which the correspondingly-shaped forward projection $i^3$ of the trigger I engages from above. In this construction of the mechanism the operation of the several parts is as follows: As the trigger is operated the nose or projection $i^2$ of the same swings the forward part of the idler or dog I upward, so that the nose $i$ presses against the nose $e$ of the sear E. (See Fig. 8.) Immediately afterward upon the forward stroke of the firing-pin and after the trigger has been pulled backward and while it is retained in this position the forward arm of the idler or dog, together with the nose $i$, moves downward again, inasmuch as, owing to the withdrawal of the said trigger to its rearmost position, the nose $i^2$ has become completely free from the shoulder $i'$, so that the dog I may yield to the action of the spring $i^3$, which controls it and which is compressed in consequence of the preceding oscillation of the nose $i$. Now upon the release of the idler or dog and as the trigger is swung forward the inclined front surface of the nose $i^2$ will slide upward along the rear edge of the shoulder $i'$ and press the idler or dog forward until finally the nose $i^2$ has moved over and past the upper edge of the said shoulder $i'$, whereupon the said idler or dog under the pressure of the spring $i^3$ springs back and becomes engaged, by means of its shoulder $i'$, with the nose $i^2$, as illustrated in Figs. 6 and 7.

The coöperation of the dog I and trigger as just described, whereby while the trigger is still held back, the idler or dog, together with the nose $i$, springs downward again, is necessary in order to enable the parts of the trigger mechanism to move out of the way while the trigger is still held back, so as to accommodate themselves to the extremely rapid operation of the parts of the breech mechanism by the recoil.

In order to so time the action of the firing-pin that its point may under no circumstances strike the percussion-cap or fulminate before the bolting or locking has taken place, the firing-pin should be provided with inclined shoulders $s^2$, Figs. 26, &c., corresponding with which notches or recesses $r^2$ are formed in the bolt-head on the rear surface of its front wall. Only when the nipples of the bolt-head are in the locked or "bolted" position, and not before, does the position of the said notches become such as to admit of the entrance of the shoulders of the firing-pin into them, so that the said firing-pin will not until then advance with its point sufficiently far beyond the front face of the bolt-head to ignite the percussion-cap or fulminate of the cartridge. This safety device is especially intended for those cases in which in consequence of, say, an excessive strain put upon the firing-pin by prolonged firing or for any other reasons the firing-pin is broken, in which case the front part might unimpeded by the nib fly forward as the breech-bolt moves in the forward direction before even the locking or bolting engagement has been restored. Owing, however, to the safety mechanism above described this is impossible, as the point of the firing-pin can never reach its extreme position before the bolt-head has occupied its locked position.

With regard to the breech-bolt it should further be mentioned that it has a rib $h^3$ extending from end to end on its lower side, whereby so far as the lower side of the system is concerned the barrel-sleeve and the breech-bolt are placed on the same level for the purpose of preventing the cartridge located at the orifice of the magazine from "catching" as the whole system or mechanism recedes. Were there no such projection then, as will be readily understood by referring particularly to Fig. 7, the cartridge lying in the magazine-orifice, with which the rifle is to be automatically loaded after firing, might be caught by the lower shoulder $m^2$ of the receding barrel extension and the parts might thus become jammed. The object of the said rib $h^3$, therefore, is to render the breech-bolt on its lower side practically level with the shoulder $m^2$ of the said barrel extension M, and thereby to retain the uppermost cartridge sufficiently far within the magazine-orifice to prevent it from being caught by the shoulder $m^2$ passing over it.

The forward-propelling springs F $f$ for the barrel and breech-bolt, respectively, are situated in the lower part of the receiver G on both sides of the breech-bolt guide within suitable hollow cylindrical extensions of the receiver, and as regards especially the spring $f$ of the breech-bolt in order to utilize the space available to the best advantage the arrangement adopted is such that the engagement between the breech-bolt and spring takes place, not at the end of such spring, but at some considerable distance in front of such end, as indicated in the diagram Fig. $22^b$. The result attained by such means is that the breech-bolt is allowed to move to the end of its path before the spring is fully compressed, lest the compressed spring should interfere with the movement of the breech-bolt as it is about to take up its extreme position. Owing to this fact—viz., that the point of engagement with the breech-bolt is situated at a certain distance in the rear of the front end of the spring—the position of such spring in the mechanism is so modified that its protrusion beyond the rear end of the path of the breech-bolt is avoided, and the arrangement of the several parts is such that the spring $f$, which with a view to its correct guidance is passed around a pin or rod of suitable length, is at its forward end surrounded by a sleeve $f^2$, against the internal end surface of which the spring $f$ abuts, while the free end of such sleeve carries a nose $f'$, in front of which the end of the arm $d'$ of the lever D, Figs. 14 and 15, takes up its position. As the breech-bolt recedes the spring case or sleeve $f^2$ is moved back along the spring or along its guiding pin or rod, the spring being at the same time compressed. The sleeve $f^2$, with its nose, is made capable of going to the end of the path of the breech-bolt without the spring being fully compressed. The spring F, operating the barrel, Figs. 20, 21, 22, &c., is also passed around a pin or rod within its case. Upon the forward end of such rod or pin there is adjustably arranged a sleeve or tube $o'$, against which the said spring abuts and which is provided with a nose or tappet $o$, which normally when the weapon is operating automatically by engaging in a recess $l$ of the barrel extension effects the coupling or engagement between the barrel and the said spring. In combination with this sleeve $o'$ there is provided the second and longer sleeve $n'$, which incloses the tube $o'$ at its forward end, carries the operating-handle N, in the stock whereof is located a spring-controlled tappet or nose $n$, which projects outward, Figs. 42 and 43.

The sleeve or tube $n'$ in order to admit of the movement of the sleeve $o'$ and its tappet $o$ is provided with a longitudinal slot $n^2$, so that when the tube or sleeve $o'$ recedes, together with the barrel, it forms a guide for the foot $o^2$ of the said tappet or nose $o$. The sleeve $n'$ may be turned on its pivot, and consequently the handle N can be turned down or reversed, so that it, or rather its sleeve $n'$, shall as it turns take the sleeve $o'$ with it, since, as before stated, the foot $o^2$ of the nose $o$ protrudes through the slot $n^2$ of the sleeve $n'$, Fig. 22. As the said handle is thus turned down or reversed to the position illustrated in Figs. 20, 21, 22 the sleeve $o'$ is also turned, and thus, together with its nose $o$, brought to the position already described as being that required for automatic firing of the rifle, where the nose $o$ engages in the recess $l$ of the barrel-sleeve, and thereby couples the spring F with the barrel. When, on the other hand, the said handle is turned to its horizontal position, Fig. 22$^a$, the sleeve $o'$ engaging with the sleeve $n'$ receives such a rotary motion whereby the nose $o$ leaves the recess $l$, and consequently the coupling or engagement between the sleeve $o'$ and the barrel-sleeve and the forwardly-propelling spring and barrel, respectively, is released; but then the spring-pressed nose $n$ of said handle at this juncture enters the recess $l$, so that the barrel, which is out of engagement with the said spring, may by means of the handle be conveniently moved backward and forward. In the uncoupled position the nose $o$ engages in a corresponding notch or slot in the stock. When the handle is turned down from its horizontal position again, its tappet $n$ once more moves out of engagement with the recess $l$, while the sleeve $o'$ receives a rotary movement, whereby the tappet or nose $o$ is moved into engagement with the recess $l$. Lastly, in connection with the said handle is a small holding device $n^3$ $n^4$, Figs. 22 and 43, which retains the said handle in the vertical turned-down position and which is readily disengaged as the said handle is turned upward again.

The cover of the receiver G is in this form of mechanism constructed in the shape of a flap or lid H, hinged to the wall of the casing. In the "closed" position it is retained by means of a catch-lever $h$, the forward end of which engages in a suitable groove of a projection $h'$ at the lower edge of the said lid or flap. By pressure upon the rearward arm of that lever it may be readily released, after which the said lid or flap may be turned on its hinge about one hundred and eighty degrees, so that the barrel extension, together with the receiver, is exposed. At its rear end the said hinged lid carries the end piece P, which is integral therewith and which when such hinged lid is shut—i. e., the receiver closed—engages in a corresponding groove $p'$ of the bottom of the receiver. By such means while the receiver is closed the said bottom piece will be sufficiently firmly interlocked with the remaining parts of such receiver to enable it to sustain without injury the great strain put upon it by the blow of the breech-bolt. The arrangement of the said end piece on the hinged flap or lid and its moving laterally away from such receiver when the said hinged lid is turned up is here adopted with a view to facilitating the taking to pieces of the weapon or rendering it possible after the lid has been turned up to withdraw the barrel, together with the breech mechanism, from the receiver in the rearward direction. In the top plate of the said lid or flap there is fitted a resilient (or spring-controlled) catch-lever $x$, Figs. 4, 5, &c., the object of which is where the non-automatic method of operation of the firearm is adopted—for example, when for the purpose of charging the magazine it is desired to retain the breech-bolt in the rearward position—to prevent the said breech-bolt flying forward in opposition to the pressure of the forwardly-propelling spring, the said lever $x$, the front part $x'$ of which is inserted in a groove in the said lid, being adapted to take up its position with its nose $x^2$ in front of the shoulder $a^2$ of the inner sliding sleeve A. The release of the breech-bolt after the magazine has been charged is thereupon effected by means of a cam $q$, which is operated from the safety "wing" or leaf Q. This cam $q$, the upper end of which acts upon the rear end of the spring-controlled catch-lever $x$, is guided vertically in the end piece P and, as stated above, is properly adjusted, by means of the said safety-leaf Q, upon the collar $q'$, Figs. 44 to 47, provided with two notches or "rests" $q^2$ $q^3$, in which its lower end rests, the resiliency of the lever $x$ at the same time imparting to it a tendency to press the said cam firmly against such collar. In the horizontal left-hand side position of the safety-leaf, Fig. 3, the lower end of the cam enters a notch $q^2$ in the said collar, so that the catch-lever $x$, uninfluenced by the cam, may assume its lower position, where its nose $x^2$ projects into the path of the projection or extension $a^2$. In this position of the catch-lever the breech-bolt after it has receded is retained in position and prevented from moving forward until by a rotary movement of the said wing or leaf in the upward direction the lower end of the cam $q$ is lifted out of the notch $q^2$ and the cam moved upward, in which movement it bends the catch-lever upward with its upper end, so that the nose $x^2$ is situated outside the path of the projection $a^2$ and that the breech-bolt after the release of its arresting device J may without hindrance spring forward through the receiver, Figs. 4 to 8. This position of the cam and the corresponding one of the catch-lever $x$ is also the position in which the automatic operation of the firearm is possible. Now in order to enable the safety leaf or wing to be secured in this position there is provided in the collar at about sixty degrees from the notch $q^2$ another smaller notch, $q^4$, in which the cam is adapted to engage, this last-mentioned notch being so flat or shallow, however, as to still cause the said cam to hold the lever in a sufficiently raised position in order to prevent the breech-bolt from being caught by the nose $x^2$. In this position of the parts the said safety wing or leaf projects obliquely upward at about sixty degrees to the horizontal plane, as clearly shown in Figs. 4 to 7 and by broken lines in Fig. 3. The safety-lever $y$, Figs. 8, 9, 12, 15, 40, and 41, which coöperates with the said safety wing or leaf, is suspended and made capable of an oscillating motion below the receiver. It is constructed in the shape of a double-armed lever, the rear arm of which carries an upwardly-pointing nose $y'$, which takes up its position against the boss of the said safety-leaf, while the forward arm has a divided nose $y^2$, which when in the "safety" position is situated in front of the part $v$ of the firing-pin collar $u$. The nose $y^2$ is divided so that by fitting around the lever E it may on both sides rest against the forward shoulders of the projection $v$. The said boss of the safety leaf or wing, Fig. 45, has a slot or recess at $y^3$, corresponding to the "unsecured" position of the safety devices, while the solid part of the said boss corresponds to the "secured" position. So long, therefore, as the safety-leaf continues in such a position that the nose or tappet $y'$ reaches into the slot or recess $y^3$ the lever $y$ will remain in the position in which its front arm is lowered, and consequently the projection $v$ is disengaged from the nose $y^2$, Fig. 8. Now when the safety wing or leaf is so turned that the solid part of the periphery of the boss acts upon the nose $y'$ the lever $y$ is so oscillated as to raise its front arm, and thereby move the nose $y^2$ in front of the projection $v$ and secure the firing-pin when in its cocked position from flying forward, Fig. 9.

Conformably with the hitherto usual arrangement of the safety devices means are also provided in the present arrangement whereby when the safety wing or leaf is in its left-hand horizontal position, Fig. 3, the weapon is unsecured, while when it is in the right-hand horizontal position, Fig. 12, the firearm is secured. Corresponding with this last-mentioned position is a further notch $q^3$ in the collar of the safety-wing, into which the cam $q$ is adapted to catch in the same way as it does in the notch $q^2$, so that consequently in this last-described position of the parts the catch-lever $x$ is also in its operative position—i. e., with its nose $x^2$ in the path of $a^2$.

The breech-bolt-arresting lever J, Figs. 14 and 15, which, as has already been indicated in the part describing the method of operation of the weapon, has for its object to retain the breech-bolt in its rearmost position until the barrel has advanced to its full extent, is made capable of oscillating under the bottom of the receiver next to the securing or safety lever Y. At its rear end the said lever J has a nose $j$, behind which a projection $k$ of suitable section or shape, forming part of the breech-bolt, takes up its position the moment such breech-bolt has taken up its rearmost position. Near the fore end there is situated the nose $j''$, which as the barrel advances is met by the projection or stop $m'$ of the barrel extension, whereby the said lever J receives such an oscillating movement as to cause the nose $j$, and consequently the breech-bolt, to be released.

The ejection of the empty cartridge-cases is effected by means of a lever $w$ suspended from the under side of the barrel extension, Figs. 23 and 24, which lever is bent near its middle part, and its bent end takes up a position behind the flange of the cartridge as the barrel moves forward, moving from behind through a groove $k'$, provided for the purpose in the rib $k^3$, whereby the ejection of the cartridge-case is insured.

The drawings furthermore show a few modifications of the several parts whose arrangements have been above described. These modifications in particular relate to the construction of the breech mechanism and breech-bolt, the bolt-head, and the receiver, Figs. 14ª and 15ª showing the general arrangement of such parts corresponding to Figs. 14 and 15.

Figs. 20ª to 20ᶠ illustrate the modified construction of the receiver and of the lid or cover of the same, the operations for opening or releasing the latter being illustrated by views of the corresponding operative positions of the several parts.

Figs. 25ª to 30ª show a modified construction of the breech-bolt, the sequence of the figures corresponding to that of Figs. 25 to 30.

Figs. 31ª to 39ª show the several parts in detail, the sequence and mode of representation being the same as those of Figs. 31 to 39.

Attention should first of all be directed to the important modification which Figs. 20ª to 20ᶠ illustrate, the result of which is that now the "thrust" end of the receiver is integral not with the lid or cover of such receiver, but with the side wall thereof. By such means increased strength is given to the said receiver—an exceedingly valuable improvement, seeing that the end piece, if the weapon continue in use for any length of time, naturally sustains a great number of thrusts and is consequently subjected to a very great strain. Instead of the hinged lid, adapted to be turned down as formerly, the receiver is closed at the top by means of a slide H', which is normally maintained in position by means of an additional nose or stop $x^3$ on the catch-lever $x$, which engages for the purpose in a corresponding notch in the upper edge (or flange) of the said end piece. This nose $x^3$ is adapted to be lifted out of engagement by means of the cam $q$, which in the modification here considered is movably arranged not, as before, in the rear wall of the receiver end, but in the interior cavity thereof. The cover or lid H' is guided upon the receiver by means of ribs $g^2$, projecting from the upper edge of the sides, which engage in corresponding grooves $h^2$ in the lateral edges of the said lid or cover, whereby the latter is guided in absolutely reliable manner.

In the safety wing or leaf Q there is provided a notch or slot $x^4$, Fig. 20$^c$, in which the rear end of the lever $x$ fits and which serves to insure the release of the lid or cover when required, for which purpose the lower shoulder of the said slot or notch $x^4$ raises the nose $x^3$ sufficiently to make it entirely free from any engagement with its abutment in the receiver end. Normally—i. e., when the firing of the rifle takes place automatically, as first described—the safety-wing or leaf is on the left-hand side set to point obliquely in the upward direction, whereby the catch-lever $x$ is held in a somewhat-raised position sufficient for its nose $x^2$ to keep clear of the breech-bolt or of the upper projection or extension $a^2$ of the inner sliding sleeve A. At this juncture, however, so far as the modified arrangement now described is concerned, the nose $x^3$ has not yet been raised sufficiently to become released from its abutment in the receiver end. In order, therefore, to admit of the release of the cover or lid, it is necessary that the catch-lever $x$ should still further be bent upward, and this result is accomplished by the slot or notch $x^4$, above mentioned, the lower beveled shoulder of which engages with the rear end of the lever from below and lifts it to the position illustrated in Fig. 20$^c$ when the safety-leaf is turned upward. The said notch or slot $x^4$ is sufficiently deep to allow of the lid or cover, together with the lifted catch-lever, being moved back for a small distance, so that the nose shall move from its recess to the position above the edge of the end which is illustrated in Fig. 20$^c$. Now when the safety-leaf is again turned back inasmuch as the nose $x^3$, lying upon the edge of the receiver end, cannot return to its notch or rest the sliding cover may be conveniently drawn along, as clearly shown in Fig. 20$^e$. The initial position of the parts before the beginning of the cover-releasing movement will be gathered from Figs. 20$^a$ and 20$^b$, and while they are in that position the safety leaf or wing occupies the horizontal position on the left-hand side. Consequently the catch-lever $x$ is in its lower position, and this completes the adjustment of the arm for single-loading, for which it is necessary that the breech-bolt should be kept from rushing forward, even though the barrel may have advanced.

Figs. 20$^c$ and 20$^d$ show the intermediate position with the safety wing or leaf pointing upward in the vertical direction, the nose $x^3$ being completely lifted out of engagement by means of the shoulder of the notch $x^4$, while the lid or cover has by then already been shifted back sufficiently to make the said nose take up its position over the edge or flange of the receiver end.

The manner in which the forwardly-propelling springs F $f$ are fitted within the receiver is substantially the same as that described above.

Now as regards the modifications made with reference to the breech-bolt the primary object is the provision of such a connection between the outer sleeve of the breech-bolt and bolt-head that the cartridge-case after firing shall be automatically made loose. To this end the bolt-head R is screwed into the outer sleeve of the breech-bolt by means of a special comparatively slow screw-thread. The pitch of the screw-threads $a'$ in the inner sliding sleeve is very steep, however, and by the coöperation of these two different screw-threads the action of the mechanism is made to take place as follows: As the inner sliding sleeve (by meeting or striking the receiver end when, as previously explained, the bolt-head, with its nipples, is turned to the released or unbolted position) is not only turned, but screwed back for a little distance, so that by means of its extractor $z$ it draws out the cartridge-case somewhat at the same time as the outer sleeve of the breech-bolt is screwed back, the cartridge-case being thus loosened or partly released from engagement. This automatic release simultaneously with the unbolting or unlocking takes place during the last phase of the backward movement of the barrel and breech-bolt, being still one of the effects of the recoil. Thus the recoil itself is utilized in inducing the partial release or loosening of the cartridge-case, so that the barrel after the backward movement has been completed and while the breech-bolt is being firmly retained in place may advance unimpeded and without the requirement of separating the cartridge-case from the barrel, which would absorb some appreciable amount of force. The barrel then, with its cartridge-support, without much friction or any special strain moves forward away from the cartridge-case previously loosened. The advance movement of the barrel is therefore in no way affected by the extraction of the cartridge-case, which is a feature of particular importance from the point of view of a prompt operation of the firearm. While the locking or bolting is being completed, or, in other words, as the sleeve retreats, the head is again screwed forward for the distance for which it had been previously screwed back to effect the unlocking. In Figs. $25^a$ and $26^a$ this latter (locked) position is illustrated, while Figs. $27^a$ and $28^a$ show the breech-bolt with the bolt-head screwed back in the unlocked position. In Figs. $29^a$ and $30^a$ the striking or firing pin is cocked in contradistinction to its position in Figs. $25^a$ and $26^a$, where it is supposed to be in the uncocked or released position, (such as that to which it is brought after firing.) Now as regards the inner sliding sleeve or tube A the rear shoulder $a^2$ of the same is here made lower, the comparatively high projection previously used, which under certain circumstances had to be placed behind the nose $x^2$ of the catch-lever, being now dispensed with. Instead of that there is provided upon the rear shoulder of the breech-bolt itself a nose $k^2$, which answers the same purpose as that which was formerly accomplished by the projection $a^2$. It should furthermore be mentioned that the said inner sliding receiver A within the outer sleeve of the breech-bolt has diametrically to the projection $a$ another projection for the noses $c\ c'$ of the arresting-lever C to engage with, so as further to secure or perfect the linear motion of the said inner sliding sleeve within the outer sleeve of the breech-bolt.

Now inasmuch as the receiver is completely closed in at its rear end by the solid thrust end piece, so that even after the removal of the lid the barrel cannot be drawn rearward of its guide in the protecting-tube, it is necessary to provide means whereby the removal of these last-mentioned parts may be conveniently effected without its being necessary to take the firearm to pieces. To this end an elevating arrangement is adopted by means of which after the release of the lower band and the removal of the receiver lid or cover H' the protecting-tube may be raised to an inclined upward position, so that the removal of the barrel, together with the breech-bolt, from the guide-groove in the protecting-tube may take place.

In Figs. $21^a$ to $21^g$ two different forms are shown in which such an elevating or erecting device may be carried out. In the form represented in Figs. $21^a$ to $21^c$ the means whereby the protecting-tube 1 is raised so as to point obliquely upward after the disengagement of the under ring consists of a screw 2, which is used as a fastening or set screw for securing in position the protecting-tube and is screwed into the foot 3 of the "sight" passed over the said protecting-tube. This screw has a steep pitch, so that by a single turn the tube may be moved home from the inclined position in which it is shown in the drawings. For turning the screw the hand-lever 4 is used, which when at rest—i. e., before the screw has been turned—holds by its outer end the magazine-closing lid or cover $g^3$. (See Fig. $21^{aa}$.) Now when the lever 4 is turned for the purpose of turning the screw and bringing the protecting-tube to the inclined or oblique position the magazine-closing lid is thereby released, so that it, together with the feeder-spring and the cartridge-feeder itself, as well as with any cartridges which may still be contained in the magazine at the time, may without difficulty be removed or, indeed, drop off of their own accord. By such means the magazine is invariably emptied at the same time as the protecting-tube is raised—that is, before the removal of the barrel and breech mechanism—else the cartridges would fly out of the magazine under the pressure of the feeder-spring in the upward direction whenever the protecting-tube were raised or the breech lifted off the magazine.

Another modification of the elevating or erecting mechanism just referred to is illustrated in Figs. $21^d$ to $21^g$. In this case a resilient securing or locking device is provided, which is embedded in the stock, and it consists of a movable pin 9, subjected to the pressure of a spring 11 and adjustable within a sleeve 13, the inner part 8 of which pin enters both when the protecting-tube is in its raised position and when it is in its lowered position, a notch or rest 7 of circular section formed for the purpose in the sight extension 5. In this extension of the sight between the two notches 7 is a comparatively narrow slot 6, which corresponds to the narrow annular reduced portion 10 of the pin 9. With a view to the erection of the protecting-tube the pin is pressed inward for a sufficient distance to cause its part 10 to be situated in the path of the said slot. Then the protecting-tube may be raised, the projection, with its slot 6, at the same time sliding past or beyond the part 10. When such projection has risen far enough to bring the lowermost of the notches 7 on a level with the pin, such pin may again rebound outward and with its part 8 enter the corresponding notch, so that the protecting-tube is firmly retained in its erect position. To effect the downward movement of such protecting-tube, the pin is then once more pressed inward until its narrow part 10 is in front of the slot 6, after which the protecting-tube may be pressed downward until finally the upper one of the notches is on a level with the pin, so that the inner end 8 of the pin is caused to enter such notch by the pressure of its spring 11. Now inasmuch as in consequence of the relatively great length of the breech-bolt-arresting lever J of the previously-described form of mechanism disturbances in the operation of the mechanism are apt to occur, owing to vibration, the arrangement illustrated in Figs. 14ᵃ and 15ᵃ should be adopted in preference. In this arrangement the lever consists of two parts J', J², engaging with or clutching each other after the manner of a knuckle-joint, one of which—the front part—carries the projection j', while the rearward part J² has a similar projection j. Each of these lever-links is subject to the action of a small helical spring, which fully performs its object as an operating medium. It has been found that the cooperation of these two parts of the lever solves the functional problem of the entire organ in a prompt and perfectly reliable manner.

Now as regards the extractor in the modified arrangement shown in Figs. 33ᵃ, 34ᵃ, and 38ᵃ a comparatively short extractor is employed, which, as shown specially in Fig. 38ᵃ, is placed on the bolt-head itself. With regard to the bolt-head it should be mentioned, moreover, that it possesses a substantially closed-in edge or flange, which has only perforations for the extractor itself and for the passage of the ejector. In this manner the rear end of the cartridge is closed in on all sides, a feature which affords additional safety from any gases that might tend to flash back. In the original form, Figs. 33 and 34, of the extractor this part is made of comparatively great length and is secured to the lateral side of the external sleeve K, as will be clearly seen from the plan Fig. 2. Now, inasmuch as the extractor being so arranged does not participate in the rotary motion of the bolt-head, it was necessary in order to provide room for the accommodation of the extractor claw or hook during such rotary movement to omit one-half of the edge or flange of the bolt-head. The modified construction shown in Figs. 33ᵃ and 34ᵃ is therefore to be preferred, since, as stated, it admits of the provision of a substantially unbroken flange or edge on the bolt-head. It should also be observed that the bolt-head in both forms of apparatus is provided with lateral apertures or gas-ports for deflecting any gases that may flash back.

It remains to be mentioned in conclusion that owing to the provision of the receiver closed in the rearward direction the marksman would in any case be effectively protected against any accidents or irregularities such as are apt to occur through defective ammunition. Especially in the modified form in which the rear end of the receiver is integral with the sides of the receiver the latter is even in the worst case absolutely safe from any danger of becoming shattered or destroyed.

What I claim as my invention, and desire to secure by Letters Patent, is—

1. A recoil-loader with a movable barrel, wherein, after firing, the barrel and breech-bolt, locked together, jointly perform the complete rearward stroke of such breech-bolt, the combination with a movable barrel having connected to its rear end a sleeve or tube in which the breech-bolt is guided, of a breech-bolt movable in the said barrel-sleeve, of a barrel forwardly-propelling spring which is adapted to again force forward the receded barrel, after the breech-bolt is unlocked, of a breech-bolt forwardly-propelling spring which is adapted to bring the breech-bolt into its forward position, after the barrel has moved forward, of a locking or driving spring, which is adapted to reëstablish the locking between barrel and breech-bolt, of a receiver forming the guide for the barrel-sleeve and being of such a length that after firing, the barrel and its sleeve respectively can recede with the locked breech-bolt to the whole length of the cartridge and still farther if necessary, and of a thrust end piece rearwardly closing the receiver, after both have moved forward, substantially as described and shown in the drawings.

2. A recoil-loader with a movable barrel, wherein, after firing, the barrel and breech-bolt, locked together, jointly perform the complete rearward stroke of such breech-bolt, the combination with a movable barrel having connected to its rear end a sleeve or tube in which the breech-bolt is guided, of a breech-bolt movable in the said barrel-sleeve, of a barrel forwardly-propelling spring which is adapted to again force forward the receded barrel, after the breech-bolt is unlocked, of a breech-bolt forwardly-propelling spring which is adapted to bring the breech-bolt into its forward position, after the barrel has moved forward, of a sleeve A slidable horizontally in the breech-bolt, of a bolt-head R engaging with the sleeve, mounted at the forward end of the breech-bolt, carrying the nipples r and turned into the unlocking and locking position by the movement of the sleeve A, substantially as described and shown in the drawings.

3. A recoil-loader with a movable barrel, wherein, after firing, the barrel and breech-bolt, locked together, jointly perform the complete rearward stroke of such breech-bolt, the combination with a movable barrel having connected to its rear end a sleeve or tube in which the breech-bolt is guided, of a breech-bolt movable in the said barrel-sleeve, of a barrel forwardly-propelling spring which is adapted to again force forward the receded barrel, after the breech-bolt is unlocked, of a breech-bolt forwardly-propelling spring which is adapted to bring the breech-bolt into its forward position, after the barrel has moved forward, of a sleeve A, having a shoulder or projection $a^2$ on its rear end to abut against the thrust end piece when the breech-bolt recedes and thereby to effect the inward movement of the sleeve A and the rotation of the bolt-head into the unlocking position, substantially as described and shown in the drawings.

4. A recoil-loader with a movable barrel, wherein, after firing, the barrel and breech-bolt, locked together, jointly perform the complete rearward stroke of such breech-bolt, the combination with a movable barrel having connected to its rear end a sleeve or tube in which the breech-bolt is guided, of a breech-bolt movable in the said barrel-sleeve, of a barrel forwardly-propelling spring which is adapted to again force forward the receded barrel, after the breech-bolt is unlocked, of a breech-bolt forwardly-propelling spring which is adapted to bring the breech-bolt into its forward position, after the barrel has moved forward, of a sleeve A, having helical projections $a'$ and bolt-head R with corresponding helical grooves $r'$ in which the projections $a'$ of the sleeve A engage, for the purpose of effecting the rotation of the bolt-head during the inward movement of the sleeve A in the breech-bolt, substantially as described and shown in the drawings.

5. A recoil-loader with a movable barrel, wherein, after firing, the barrel and breech-bolt, locked together, jointly perform the complete rearward stroke of such breech-bolt, the combination with a movable barrel having connected to its rear end a sleeve or tube in which the breech-bolt is guided, of a breech-bolt movable in the said barrel-sleeve, of a barrel forwardly-propelling spring which is adapted to again force forward the receded barrel, after the breech-bolt is unlocked, of a breech-bolt forwardly-propelling spring which is adapted to bring the breech-bolt into its forward position, after the barrel has moved forward, of a handle N, which can be turned up and down and is provided with a tappet or nose $n$ and an adjusting device, which is adapted, in the upwardly-folded position of the handle when the nose $n$ is in engagement with the barrel, to disengage the barrel forwardly-propelling spring, and to reëstablish the connection of the barrel with the barrel forwardly-propelling spring when the handle is turned down, of a bolt-head R carrying at its rear end, with which it is connected to the outer sleeve of the breech-bolt, a screw-thread, the outer sleeve of the breech-bolt being also provided within at its front end with a corresponding screw-thread, both screw-threads coöperating in such a manner that when the bolt-head is turned into the unlocking position, the latter is screwed inward within the outer sleeve of the breech-bolt for the purpose of enabling the cartridge-case to be somewhat withdrawn or loosened out of its bearing by the inwardly-moved bolt-head before the case has been completely withdrawn by the advanced barrel and while the breech-bolt is being retained in place, substantially as described and shown in the drawings.

6. A recoil-loader with a movable barrel, wherein, after firing, the barrel and breech-bolt, locked together, jointly perform the complete rearward stroke of such breech-bolt, the combination with a movable barrel having connected to its rear end a sleeve or tube in which the breech-bolt is guided, of a breech-bolt movable in the said barrel-sleeve, of a barrel forwardly-propelling spring, which is adapted to again force forward the receded barrel, after the breech-bolt is unlocked, of a breech-bolt forwardly-propelling spring adapted to bring the breech-bolt into its forward position after the barrel has moved forward, of a locking or driving spring, which is adapted to reëstablish the locking between barrel and breech-bolt after both have moved forward, and of a receiver forming the guide for the barrel-sleeve and being integral with the magazine, the thrust end piece, which rearwardly closes the receiver, being integral with the side walls, so that the whole receiver and magazine can take up the recoil of the sleeve A abutting against the thrust end piece, substantially as described and shown in the drawings.

7. A recoil-loader with a movable barrel, wherein, after firing, the barrel and breech-bolt, locked together, jointly perform the complete rearward stroke of such breech-bolt, the combination with a movable barrel having connected to its rear end a sleeve or tube in which the breech-bolt is guided, of a breech-bolt movable in the said barrel-sleeve, of a barrel forwardly-propelling spring, which is adapted to again force forward the receded barrel after the breech-bolt is unlocked, of a breech-bolt forwardly-propelling spring adapted to bring the breech-bolt into its forward position after the barrel has moved forward, of a locking or driving spring, which is adapted to reëstablish the locking between barrel and breech-bolt after both have moved forward, and of a receiver forming the guide for the barrel-sleeve and being integral with the magazine, the thrust end piece, which rearwardly closes the receiver, being integral with the side walls, so that the whole receiver and magazine can take up the recoil of the sleeve A abutting against the thrust end piece, of an arresting device C with an arresting-lever adapted to oscillate on the breech-bolt, which lever, when the sleeve A abuts against the thrust end piece, engages in this sleeve and secures the same in its inwardly-moved position until the breech-bolt is again in the locking position, substantially as described and shown in the drawings.

8. A recoil-loader with a movable barrel, wherein, after firing, the barrel and breech-bolt, locked together, jointly perform the complete rearward stroke of such breech-bolt, the combination with a movable barrel having connected to its rear end a sleeve or tube in which the breech-bolt is guided, of a breech-bolt movable in the said barrel-sleeve, of a barrel forwardly-propelling spring which is adapted to again force forward the receded barrel, after the breech-bolt is unlocked, of a breech-bolt forwardly-propelling spring which is adapted to bring the breech-bolt into its forward position, after the barrel has moved forward, and of an arresting-lever J, which is suspended from the lower side of the receiver and has two noses or projections, the rear one *j* engaging with a projection of the breech-bolt, while the front nose *j''* lies in the path of a projection of the barrel-sleeve, for the purpose of automatically locking the breech-bolt in its rearward position until the barrel has moved into its forward position, the arresting-lever being released at the end of this movement, so that the breech-bolt can move into the locking position, substantially as described and shown in the drawings.

9. A recoil-loader with a movable barrel, wherein, after firing, the barrel and breech-bolt, locked together, jointly perform the complete rearward stroke of such breech-bolt, the combination with a movable barrel having connected to its rear end a sleeve or tube in which the breech-bolt is guided, of a breech-bolt movable in the said barrel-sleeve, of a barrel forwardly-propelling spring, which is adapted to again force forward the receded barrel, after the breech-bolt is unlocked, of a breech-bolt forwardly-propelling spring which is adapted to bring the breech-bolt into its forward position, after the barrel has moved forward, and of a catch-lever *x* which is spring-mounted in the receiver and has a nose lying in the path of the breech-bolt and adapted to secure the breech-bolt in its rearward position, when the firearm is used as a single-loader, substantially as described and shown in the drawings.

10. A recoil-loader with a movable barrel, wherein, after firing, the barrel and breech-bolt, locked together, jointly perform the complete rearward stroke of such breech-bolt, the combination with a movable barrel having connected to its rear end a sleeve or tube in which the breech-bolt is guided, of a breech-bolt movable in the said barrel-sleeve, of a barrel forwardly-propelling spring which is adapted to again force forward the receded barrel, after the breech-bolt is unlocked, of a breech-bolt forwardly-propelling spring which is adapted to bring the breech-bolt into its forward position, after the barrel has moved forward, and of a safety-wing Q adapted to be turned down and to release the said catch-lever *x* so as to adjust the firearm for automatic loading, substantially as described and shown in the drawings.

11. A recoil-loader with a movable barrel, wherein, after firing, the barrel and breech-bolt, locked together, jointly perform the complete rearward stroke of the breech-bolt, the combination with a movable barrel having connected to its rear end a sleeve or tube, in which the breech-bolt is guided, and of a barrel forwardly-propelling spring adapted to again force forward the receded barrel, with a breech-bolt movable in the said barrel-sleeve, of a firing-pin centrally mounted in this breech-bolt, and of a safety-lever Y coöperating with this firing-pin, said lever being suspended from the lower side of the receiver and having on its front arm a nose or projection $y^2$, which engages in the safety position behind the barrel-sleeve M and in front of a projection of the firing-pin for preventing any movement of the advanced barrel and the cocked firing-pin, substantially as described and shown in the drawings.

12. A recoil-loader with a movable barrel, wherein, after firing, the barrel and breech-bolt, locked together, jointly perform the complete rearward stroke of such breech-bolt, the combination with a movable barrel having connected to its rear end a sleeve or tube in which the breech-bolt is guided, of a breech-bolt movable in the said barrel-sleeve, of a barrel forwardly-propelling spring which is adapted to again force forward the receded barrel, after the breech-bolt is unlocked, of a breech-bolt forwardly-propelling spring which is adapted to bring the breech-bolt into its forward position, after the barrel has moved forward, of a handle N, which can be turned up and down and is provided with a tappet or nose *n* and an adjusting device, which is adapted, in the upwardly-folded position of the handle when the nose *n* is in engagement with the barrel, to disengage the barrel forwardly-propelling spring, and to reëstablish the connection of the barrel with the barrel forwardly-propelling spring when the handle is turned down, substantially as described and shown in the drawings.

13. A recoil-loader with a movable barrel, wherein, after firing, the barrel and breech-bolt, locked together, jointly perform the complete rearward stroke of such breech-bolt, the combination with a movable barrel having connected to its rear end a sleeve or tube in which the breech-bolt is guided, of a breech-bolt movable in the said barrel-sleeve, of a barrel forwardly-propelling spring, which is adapted to again force forward the receded barrel, after the breech-bolt is unlocked, of a breech-bolt forwardly-propelling spring adapted to bring the breech-bolt into its forward position after the barrel has moved forward, of a locking or driving spring, which is adapted to reëstablish the locking between barrel and breech-bolt after both have moved forward, of a receiver forming the guide for the barrel-sleeve and being integral with the magazine, the thrust end piece, which rearwardly closes the receiver, being integral with the side walls, and of a device for elevating or erecting the barrel and its outer tube together with the breech mechanism this device having a set-screw engaging with a projection of the said outer tube, and a hand-lever which serves to turn the screw, at the same time retaining the magazine bottom, the purpose being, whenever the said outer tube is raised, and before the removal of the barrel and breech mechanism from the weapon, to insure the simultaneous evacuation of the magazine, substantially as described and shown in the drawings.

In testimony that I claim the foregoing as my invention I have signed my name in presence of two subscribing witnesses.

PAUL MAUSER.

Witnesses:
    HENRY HASPER,
    WOLDEMAR HAUPT.